(12) United States Patent
Tsuchida et al.

(10) Patent No.: US 8,711,139 B2
(45) Date of Patent: Apr. 29, 2014

(54) METHOD OF DRIVING STEREOSCOPIC DISPLAY APPARATUS AND STEREOSCOPIC DISPLAY APPARATUS

(75) Inventors: Shinya Tsuchida, Osaka (JP); Shinya Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 524 days.

(21) Appl. No.: 13/171,925

(22) Filed: Jun. 29, 2011

(65) Prior Publication Data

US 2011/0261034 A1 Oct. 27, 2011

Related U.S. Application Data

(63) Continuation of application No. PCT/JP2010/002342, filed on Mar. 31, 2010.

(51) Int. Cl.
*G09G 5/00* (2006.01)
(52) U.S. Cl.
USPC .......................... 345/213; 345/204; 345/212
(58) Field of Classification Search
CPC .......... G09G 3/003; G09G 3/18; G09G 3/36; G09G 3/3648; G09G 3/3659; G09G 5/12; G09G 5/14; G09G 5/18; G09G 2300/0876; G09G 2310/08
USPC .................... 345/87–100, 204–215, 690, 691
See application file for complete search history.

(56) References Cited

U.S. PATENT DOCUMENTS

| | | | |
|---|---|---|---|
| 4,772,943 A | 9/1988 | Nakagawa et al. | |
| 4,870,486 A | 9/1989 | Nakagawa et al. | |
| 2005/0073474 A1 | 4/2005 | Kim et al. | |
| 2010/0033462 A1 | 2/2010 | Hasegawa et al. | |
| 2012/0105605 A1* | 5/2012 | Nam et al. | 348/51 |
| 2012/0113159 A1* | 5/2012 | Chiba et al. | 345/690 |
| 2012/0154359 A1* | 6/2012 | Shibata et al. | 345/209 |
| 2012/0154450 A1* | 6/2012 | Aho et al. | 345/690 |
| 2012/0274556 A1* | 11/2012 | Suglyama et al. | 345/156 |
| 2013/0076724 A1* | 3/2013 | Park et al. | 345/212 |
| 2013/0257926 A1* | 10/2013 | Lee et al. | 345/691 |

FOREIGN PATENT DOCUMENTS

| | | |
|---|---|---|
| JP | 63-46410 | 2/1988 |
| JP | 2000-036969 | 2/2000 |
| JP | 2003-122303 | 4/2003 |
| JP | 2003-302937 | 10/2003 |
| JP | 2009-31523 | 2/2009 |
| JP | 2010-39399 | 2/2010 |

* cited by examiner

*Primary Examiner* — Vijay Shankar
(74) *Attorney, Agent, or Firm* — Greenblum & Bernstein, P.L.C.

(57) ABSTRACT

A stereoscopic display includes an image displayer. The image displayer includes a display that is configured to sequentially display a right-eye image and a left-eye image. The display includes a first region that includes first rows and a second region that includes second rows. A method of driving the stereoscopic display includes sequentially repeating: writing first image data to the second region when the first region is in an image displaying state; setting the second region to the image displaying state and the first region to an image not-displaying state after the image data is written to the second region; writing second image data to the first region when the second region is in the image displaying state; and setting the first region to the image displaying state and the second region to the image not-displaying state after the second image data is written to the first region.

8 Claims, 18 Drawing Sheets

METHOD OF DRIVING STEREOSCOPIC DISPLAY APPARATUS AND STEREOSCOPIC DISPLAY APPARATUS

CROSS REFERENCE TO RELATED APPLICATION

This is a continuation application of PCT Application No. PCT/JP10/002,342, filed on Mar. 31, 2010, designating the United States of America, the disclosure of which, including the specification, drawings and claims, is incorporated herein by reference in its entirety.

BACKGROUND OF THE INVENTION

1. Field of the Invention

The present invention relates to a method of driving a stereoscopic display apparatus adapted to display stereoscopic video, and to a stereoscopic display apparatus.

2. Description of the Related Art

Conventionally, various methods have been considered to display stereoscopic video. As an example, there is a method for generating stereoscopic video by alternately displaying on a display apparatus a video signal for one eye and a video signal for the other eye which create a disparity for visually recognizing the stereoscopic video, and by switching shutters of a glasses unit having electronic shutters.

In this method, a video signal for a picture of the stereoscopic video is separated into a video signal for a first frame with which image data for one eye (right eye) is set and a video signal for a second frame with which image data for the other eye (left eye) is set. Then, the video signal of the first frame and the video signal of the second frame are alternately displayed on a display unit by the hold-type display method in which the luminance of a previous image is held until pixel units receive the next rewriting signal. The viewer can recognize one picture of the stereoscopic video through the glasses unit which opens and closes right and left shutters in synchronization with the first and the second frames.

Specifically, when displaying the video signal of the first frame with which the right-eye image data is set, the left-eye shutter of the glasses unit is closed so that the viewer recognizes the right-eye video signal, and when displaying the video signal of the second frame with which the left-eye image data is set, the right-eye shutter of the glasses unit is closed so that the viewer recognizes the left-eye video signal. With this, the viewer can recognize the stereoscopic video (For example, see Japanese Unexamined Patent Application Publication No. 63-46410 (Patent Reference 1)).

With the stereoscopic display apparatus disclosed in Patent Reference 1, the scanning lines of the display unit in which video signals are scanned are divided into an odd-numbered block made up of odd-numbered rows (odd-numbered lines) and an even-numbered block made up of even-numbered rows (even-numbered lines). Then, the operation for driving the glasses unit and the video signals displayed on the display unit are controlled in synchronization in such a manner that the video signal of the first frame with which the right-eye image data is set is displayed in the even-numbered block, and the video signal of the second frame with which the left-eye image data is set is displayed in the odd-numbered block, so that the video signal displayed in the even-numbered block can be recognized by the right eye, and the video signal displayed in the odd-numbered block can be recognized by the left eye, for example.

SUMMARY OF THE INVENTION

However, the above conventional technique has caused the following problems.

Specifically, with the above stereoscopic display apparatus, a video signal of one frame is divided into a video signal for the right eye and a video signal for the left eye so as to be separately displayed on the display unit, thereby resulting in, as compared to the case of not performing stereoscopic display, an increase in the drive frequency for the scanning performed for the display of the video signals on the display unit. It also results in an increase in the power consumption due to light emission during a time in which light emission is unnecessary, such as when the video signal for the right eye is displayed while the right-eye shutter is closed.

In addition, in displaying the left-eye and right-eye video signals, in the case of performing stereoscopic display while switching between video display and black display to prevent the viewer from recognizing the left-eye and right-eye video signals without distinction therebetween, it has been necessary to further raise the drive frequency or collectively hide the displayed images. The measures taken by the stereoscopic display apparatus disclosed in Patent Reference 1 are to open and close the left and right shutters of the glasses unit on a per-scanning line basis in order to reduce flicker. Consequently, the display of the video signals on the display unit is performed on a per-scanning line basis, and it is not possible to collectively display or collectively not display the video signals of one frame on the entire screen. This has resulted in an increase in the power consumption due to light emission during a time in which light emission is unnecessary.

In view of the above problems, the present invention aims to provide a method of driving a stereoscopic display apparatus and a stereoscopic display apparatus for displaying stereoscopic video with less power consumption without raising the drive frequency.

In order to solve the above problems, a method of driving a stereoscopic display apparatus according to an implementation of the present invention is a method of driving a stereoscopic display apparatus, the stereoscopic display apparatus including: an image display unit including a display unit configured to sequentially display a right-eye image and a left-eye image; and a pair of glasses with which the right-eye image and the left-eye image can be sequentially viewed, the method including the following steps performed for the display unit: a first step of writing, when a first display region including a plurality of rows is in an image displaying state, image data to a second display region including a plurality of rows different from the plurality of rows included in the first display region; a second step of putting the second display region in the image displaying state and putting the first display region in an image not-displaying state after the image data is written to the second display region; a third step of writing image data to the first display region when the second display region is in the image displaying state; and a fourth step of putting the first display region in the image displaying state and putting the second display region in the image not-displaying state after the image data is written to the first display region, wherein a sequence of the first to fourth steps is repeated.

With the method of driving a stereoscopic display apparatus and the stereoscopic display apparatus according to the present invention, stereoscopic video can be displayed with less power consumption without raising the drive frequency.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
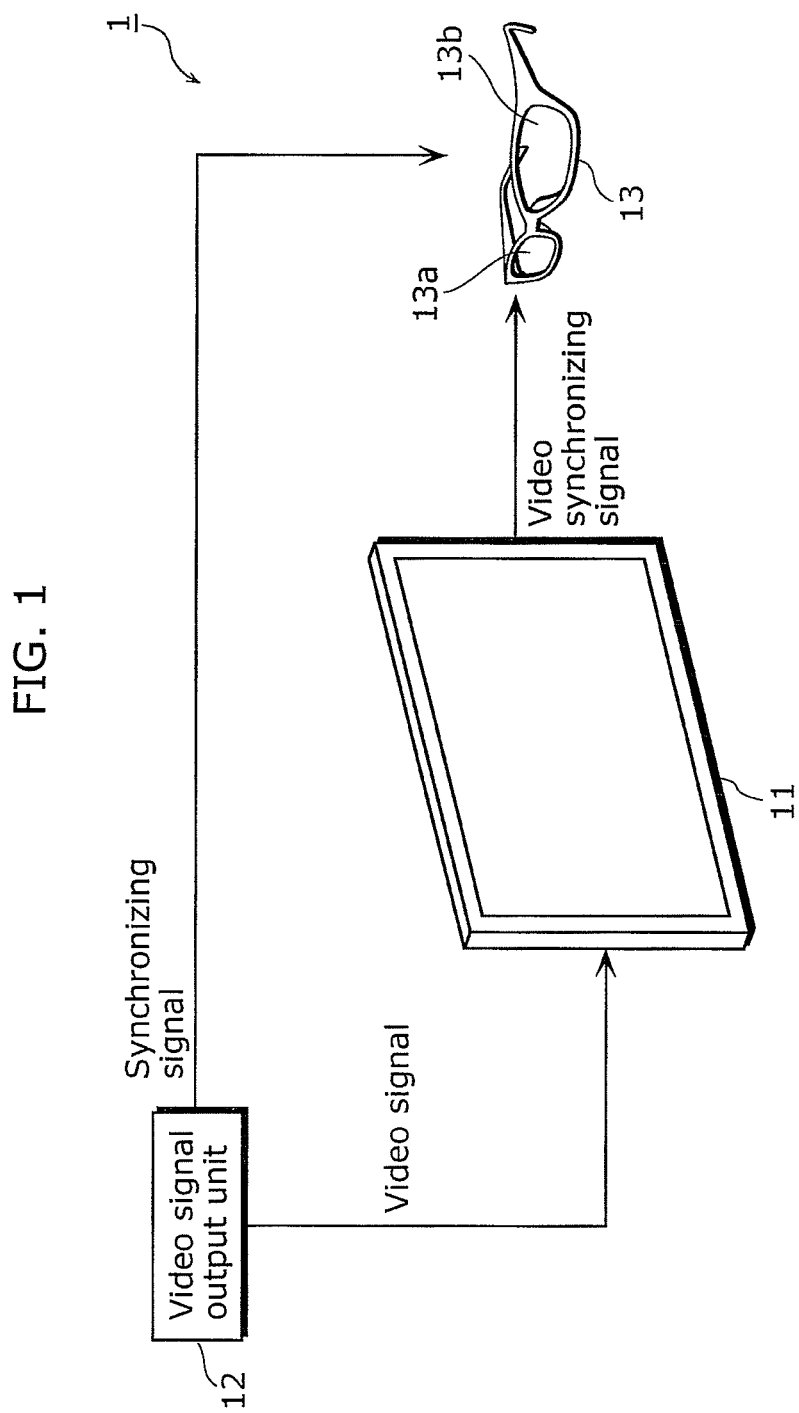
FIG. 1 is a block diagram showing a configuration of a video display system according to a first embodiment of the present invention.

A method of driving a stereoscopic display apparatus according to an implementation of the present invention is a method of driving a stereoscopic display apparatus, the stereoscopic display apparatus including: an image display unit including a display unit configured to sequentially display a right-eye image and a left-eye image; and a pair of glasses with which the right-eye image and the left-eye image can be sequentially viewed, the method including the following steps performed for the display unit: a first step of writing, when a first display region including a plurality of rows is in an image displaying state, image data to a second display region including a plurality of rows different from the plurality of rows included in the first display region; a second step of putting the second display region in the image displaying state and putting the first display region in an image not-displaying state after the image data is written to the second display region; a third step of writing image data to the first display region when the second display region is in the image displaying state; and a fourth step of putting the first display region in the image displaying state and putting the second display region in the image not-displaying state after the image data is written to the first display region, wherein a sequence of the first to fourth steps is repeated.

In a method of driving a stereoscopic display apparatus according to an implementation of the present invention, each of the right-eye image and the left-eye image is made to correspond to either the first display region or the second display region, in the first step, image data of one of the right-eye image and the left-eye image which corresponds to the second display region is written to the second display region, in the second step, an image of the image data written in the first step is displayed, in the third step, image data of the other one of the right-eye image and the left-eye image which corresponds to the first display region is written to the first display region, and in the fourth step, an image of the image data written in the third step is displayed.

In a method of driving a stereoscopic display apparatus according to an implementation of the present invention, each of the right-eye image and the left-eye image is divided into a first group and a second group in correspondence with either the first display region or the second display region, the method includes a total of eight steps including the first to fourth steps and subsequent first to fourth steps performed after the first to fourth steps, and a one-to-one correspondence is established between (i) a first period in which the first step and the second step are performed, a second period in which the third step and the fourth step are performed, a third period in which the subsequent first step and the subsequent second step are performed, and a fourth period in which the subsequent third step and the subsequent fourth step are performed, and (ii) the first group of the right-eye image, the second group of the right-eye image, the first group of the left-eye image, and the second group of the left-eye image, so that image data of each group is written in the corresponding one of the first to fourth periods, and that an image of the written image data is displayed.

According to this implementation, the display unit is divided into two display regions in units of rows (lines), and when an image is displayed in one of the display regions, no image is displayed on, but image data is written to, the other display region, thereby making it possible to reduce the drive frequency to, for example, a quarter of the drive frequency in the conventional stereoscopic display driving method, and to display stereoscopic video with less power consumption.

According to this implementation, each of the right-eye image data and the left-eye image data is written and displayed in correspondence with one of the first display region and the second display region, thereby making it possible to efficiently display video signals for the right and left eyes in synchronization with the shutters of the glasses unit.

According to this implementation, stereoscopic video can be displayed with less power consumption without raising the drive frequency, while ensuring a vertical resolution substantially equivalent to that in the conventional stereoscopic display driving method.

In a method of driving a stereoscopic display apparatus according to an implementation of the present invention, one of the first display region and the second display region includes a plurality of odd-numbered rows starting from one end of the display unit, and the other one of the first display region and the second display region includes a plurality of even-numbered rows starting from the one end of the display unit.

In a method of driving a stereoscopic display apparatus according to an implementation of the present invention, one of the first display region and the second display region includes a plurality of rows located in an upper half of the display unit, and the other one of the first display region and the second display region includes a plurality of rows located in a lower half of the display unit.

In a method of driving a stereoscopic display apparatus according to an implementation of the present invention, the display unit includes an organic electroluminescent (EL) element.

According to this implementation, the display unit includes an organic EL element, thereby allowing the display unit to be driven more promptly than a stereoscopic display apparatus in which the display unit includes a liquid crystal display (LCD). This enables reduction in the driving time.

A stereoscopic display apparatus according to an implementation of the present invention is a stereoscopic display apparatus including: an image display unit including a display unit configured to sequentially display a right-eye image and a left-eye image; and a pair of glasses with which the right-eye image and the left-eye image can be sequentially viewed, wherein the display unit includes: a first display region including a plurality of rows in which a plurality of display pixels are arranged; and a second display region including a plurality of rows which are different from the plurality of rows included in the first display region and in which a plurality of display pixels different from the plurality of display pixels arranged in the first display region are arranged, the image display unit includes a display control unit configured to write image data to the first display region and the second display region, and to switch a state of the first display region and a state of the second display region between an image displaying state and an image not-displaying state, and the display control unit is configured to: write image data to the second display region when the first display region is in the image displaying state; put the second display region in the image displaying state and put the first display region in the image not-displaying state after the image data is written to the second display region; write image data to the first display region when the second display region is in the image displaying state; and put the first display region in the image displaying state and put the second display region in the image not-displaying state after the image data is written to the first display region.

In a stereoscopic display apparatus according to an implementation of the present invention, one of the first display region and the second display region includes a plurality of odd-numbered rows starting from one end of the display unit, and the other one of the first display region and the second display region includes a plurality of even-numbered rows starting from the one end of the display unit.

In a stereoscopic display apparatus according to an implementation of the present invention, one of the first display region and the second display region includes a plurality of rows located in an upper half of the display unit, and the other one of the first display region and the second display region includes a plurality of rows located in a lower half of the display unit.

According to this implementation, the display unit is divided into two display regions in units of rows (lines), and when an image is displayed in one of the display regions, no image is displayed on, but image data is written to, the other display region, thereby making it possible to display stereoscopic video while reducing the drive frequency and the power consumption as compared to the conventional stereoscopic display driving method.

In a stereoscopic display apparatus according to an implementation of the present invention, the display unit includes an organic electroluminescent (EL) element.

According to this implementation, the display unit includes an organic EL element, thereby allowing the display unit to be driven more promptly than a stereoscopic display apparatus in which the display unit includes an LCD. This enables reduction in the driving time.

In a stereoscopic display apparatus according to an implementation of the present invention, the display control unit includes: a scanning line drive unit configured to supply a scanning signal to the display pixels on a row-by-row basis; a data line drive unit configured to write image data to each of the display pixels; and a power supply switching unit configured to supply a driving current or a driving voltage to the display pixels, and to switch the state of the first display region and the state of the second display region between the image displaying state and the image not-displaying state depending on whether or not the driving current or the driving voltage is being supplied.

According to this implementation, the power supply switching unit can supply the driving current or the driving voltage to the display pixels and collectively switch the states of the display pixels between the image displaying state and the image not-displaying state. Thus, it is possible to reduce unnecessary power consumption by collectively displaying or collectively not displaying, on the entire screen, image information on one frame.

In a stereoscopic display apparatus according to an implementation of the present invention, the scanning line drive unit includes: a first scanning line drive unit configured to supply the scanning signal to the display pixels which belong to the first display region; a first power supply switching unit configured to switch states of the display pixels which belong to the first display region, to either the image displaying state or the image not-displaying state; a second scanning line drive unit configured to supply the scanning signal to the display pixels which belong to the second display region; and a second power supply switching unit configured to switch states of the display pixels which belong to the second display region, to either the image displaying state or the image not-displaying state.

According to this implementation, two scanning line drive units and two power supply switching units are provided, and thus when the display unit is divided into two blocks, it is possible to efficiently reduce unnecessary power consumption by collectively displaying or collectively not displaying, on the entire screen, video signals of one frame on a block-by-block basis.

Hereinafter, a video display system including a stereoscopic display apparatus according to embodiments of the present invention is described with reference to the drawings. Note that hereinafter, identical or equivalent elements are given the same numerical references throughout the drawings, and descriptions thereof are not repeated.

(First Embodiment)

A method of driving a stereoscopic display apparatus according to a first embodiment of the present invention is a method of driving a stereoscopic display apparatus, the stereoscopic display apparatus including: an image display unit including a display unit configured to sequentially display a right-eye image and a left-eye image; and a pair of glasses with which the right-eye image and the left-eye image can be sequentially viewed, the method including the following steps performed for the display unit: a first step of writing, when a first display region including a plurality of rows is in an image displaying state, image data to a second display region including a plurality of rows different from the plurality of rows included in the first display region; a second step of putting the second display region in the image displaying state and putting the first display region in an image not-displaying state after the image data is written to the second display region; a third step of writing image data to the first display region when the second display region is in the image displaying state; and a fourth step of putting the first display region in the image displaying state and putting the second display region in the image not-displaying state after the image data is written to the first display region, wherein a sequence of the first to fourth steps is repeated.

Such a configuration makes it possible to reduce the drive frequency to, for example, a quarter of the drive frequency in the conventional stereoscopic display driving method, and to display stereoscopic video with less power consumption.

Hereinafter, the first embodiment is described with reference to the drawings, using an example of a video display system which includes an organic electroluminescent (EL) panel display.

FIG. 1 is a block diagram showing a configuration of the video display system according to the first embodiment of the present invention. As shown in FIG. 1, a video display system 1 includes: a display apparatus 11, a video signal output unit 12, and a glasses unit 13. Note that the video display system 1 corresponds to the stereoscopic display apparatus in the present invention, and the display apparatus 11 corresponds to the image display unit in the present invention.

The video signal output unit 12 outputs a video signal to the display apparatus 11 and also outputs a synchronizing signal to the glasses unit 13. Here, the video signal may be a signal of any one of stereoscopic video and flat video. In addition, the synchronizing signal is a signal for informing the glasses unit 13 of whether the video signal output to the display apparatus 11 is right-eye image data or left-eye image data.

Figure 2:
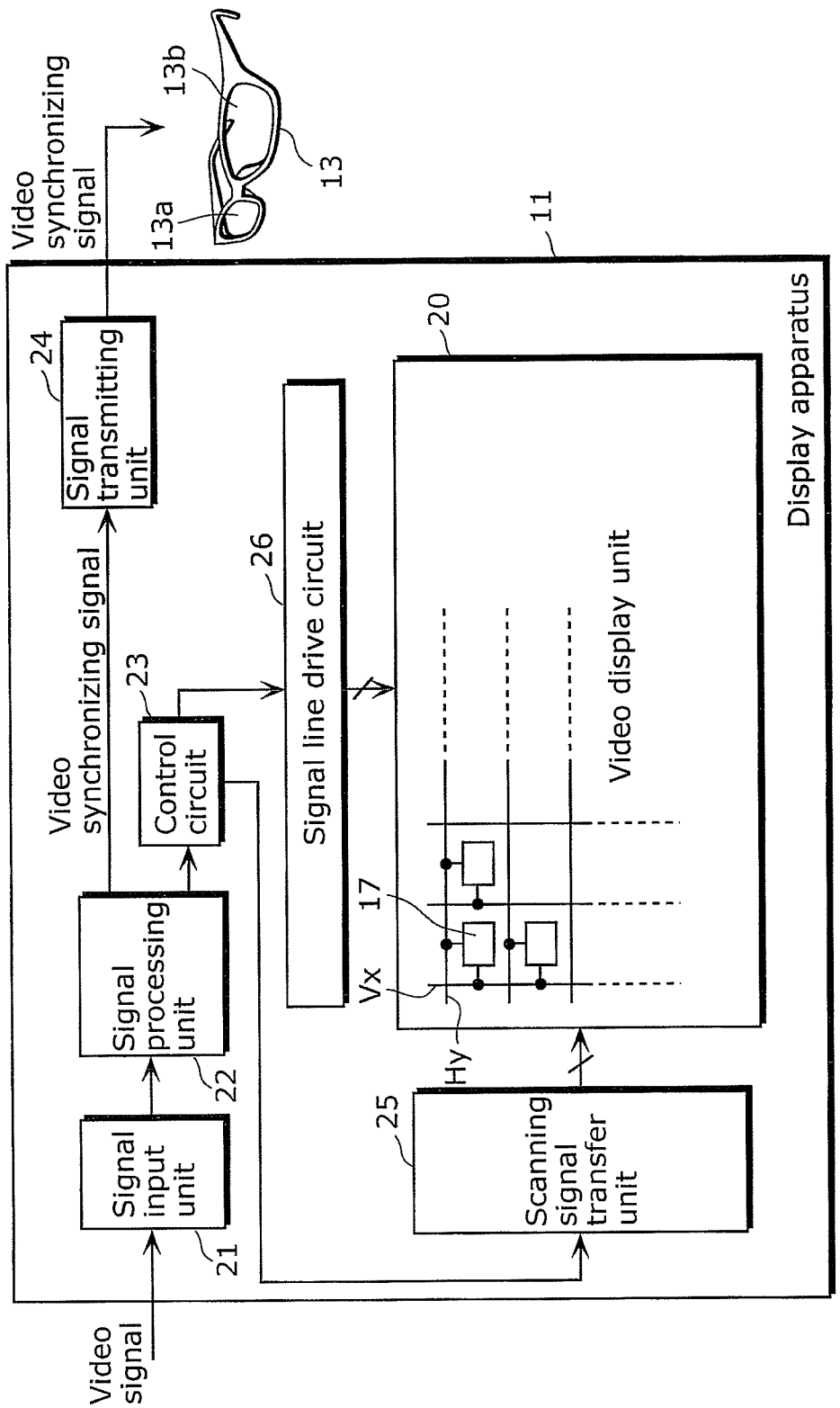
FIG. 2 is a block diagram showing a configuration of a stereoscopic display apparatus in FIG. 1.

FIG. 2 is a block diagram showing a configuration of the display apparatus 11 in FIG. 1. As shown in FIG. 2, the display apparatus 11 includes: a video display unit 20, a signal input unit 21, a signal processing unit 22, a control circuit 23, a signal transmitting unit 24, a scanning signal transfer unit 25, and a signal line drive circuit 26. Note that the video display unit 20, the scanning signal transfer unit 25, and the signal line drive circuit 26 correspond, respectively, to the display unit, the scanning line drive unit, and the data line drive unit in the present invention. Furthermore, the control circuit 23, the scanning signal transfer unit 25, and the signal line drive circuit 26 correspond to the display control unit in the present invention.

The video display unit 20 includes rows (lines) each including pixel units 17, and displays a video signal based on the image data input into the display apparatus 11 from the video signal output unit 12. Connected to each pixel unit 17 are: a gate line Hy (y=1, 2, . . . , y−1, y) through which a scanning signal for driving a drive element 17b is supplied; and a data line Vx (x=1, 2, . . . , x−1, x) through which image data is supplied to the pixel unit 17. The gate line Hy and the data line Vx are described later. The video display unit 20 includes: an odd-numbered block made up of the pixel units 17 connected to the odd-numbered lines of the gate lines Hy; and an even-numbered block made up of the pixel units 17 connected to the even-numbered lines of the gate lines Hy. Here, the odd-numbered block and the even-numbered block correspond, respectively, to the first display region and the second display region in the present invention. Note that the first display region and the second display region are not limited to the odd-numbered block and the even-numbered block. For example, the first display region may be the upper half of the video display unit, and the second display region may be the lower half of the video display unit.

Figure 3:
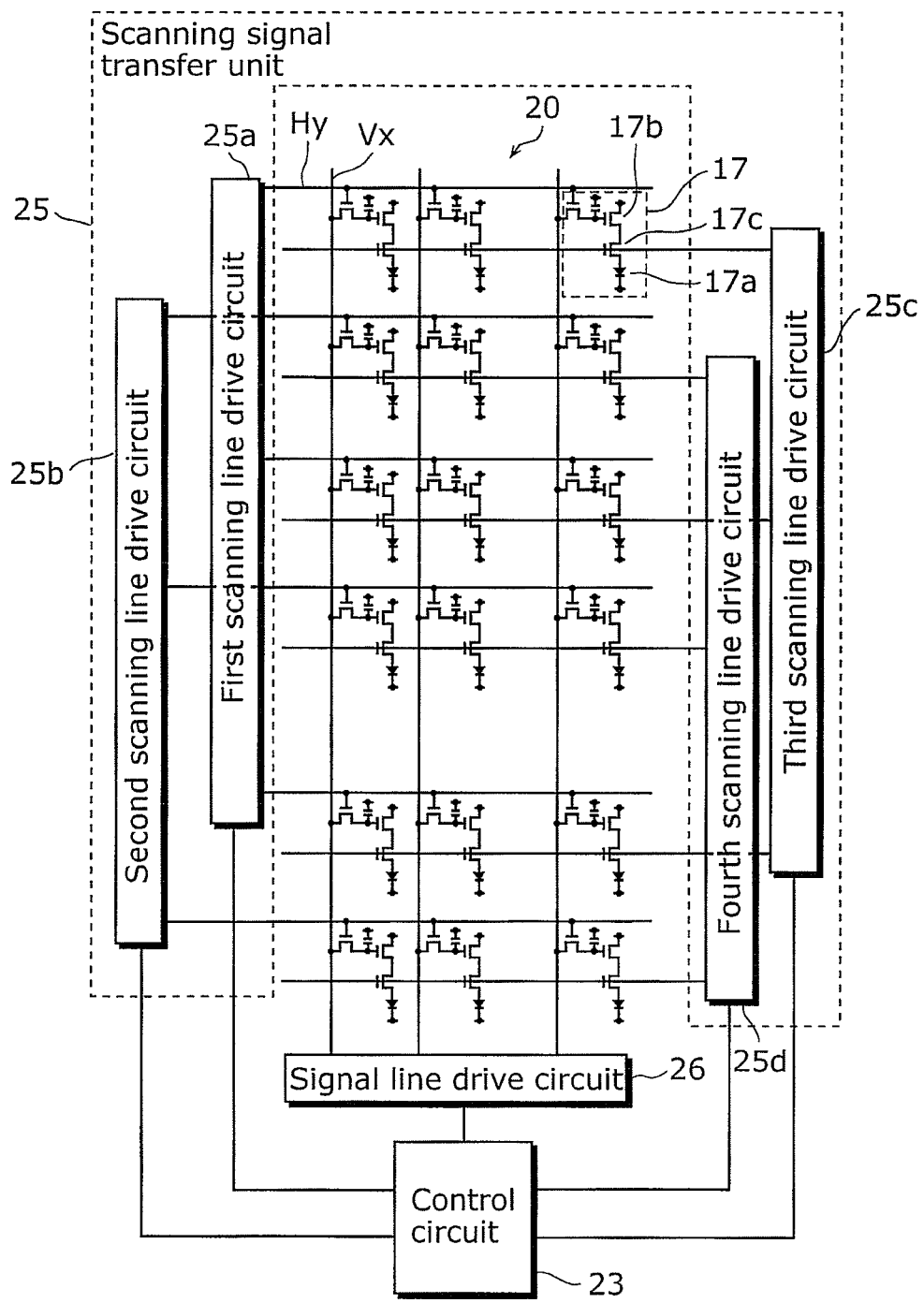
FIG. 3 is a circuit diagram showing a detailed configuration of a part of a display apparatus in FIG. 2.

FIG. 3 is a circuit diagram showing detailed configurations of the video display unit 20, the control circuit 23, the scanning signal transfer unit 25, and the signal line drive circuit 26. As shown in FIG. 3, each pixel unit 17 includes, for example, a light-emitting element 17a, a drive element 17b which controls an electric current supply to the light-emitting element 17a, and a selecting element 17c for selecting a pixel unit 17 in a desired line. In the pixel unit 17 selected by the operation of the selecting element 17c, according to the above-described video signal, the drive element 17b is driven by a signal input into the gate line Hy, and an electric current is supplied to the light-emitting element 17a according to the signal input from the data line Vx, thereby causing the light-emitting element 17a to produce luminescence.

In addition, as shown in FIG. 2, the signal input unit 21 receives, from the video signal output unit 12 provided outside the display apparatus 11, a video signal in which the right-eye image data and the left-eye image data are not separated, and supplies the received video signal to the signal processing unit 22.

The signal processing unit 22 separates the right-eye image data and the left-eye image data from the received video signal, and outputs the right-eye image data and the left-eye image data to the control circuit 23. In addition, the signal processing unit 22 also supplies, to the signal transmitting unit 24, a video synchronizing signal which indicates timing of switching between the right-eye image data and the left-eye image data.

The control circuit 23 generates a scanning signal for driving the scanning signal transfer unit 25 according to the right-eye image data and the left-eye image data input from the signal processing unit 22, and supplies the scanning signal to the scanning signal transfer unit 25. Specifically, the scanning signal transfer unit 25 is supplied with the scanning signal for scanning the right-eye image data of one picture (one frame) in every other line starting from a gate line H1 that is the head line of the odd-numbered block of the video display unit 20 to a gate line Hy−1 that is the final line of the odd-numbered block, and for scanning the left-eye image data subsequent to the right-eye image data in every other line starting from a gate line H2 that is the head line of the even-numbered block of the video display unit 20 to a gate line Hy that is the final line of the even-numbered block. In addition, the control circuit 23 supplies, to the signal line drive circuit 26, the right-eye image data and the left-eye image data input from the signal processing unit 22.

The signal transmitting unit 24 transmits, to the glasses unit 13, the video synchronizing signal supplied from the signal processing unit 22.

The scanning signal transfer unit 25 includes a switch such as a shift register, and causes the light-emitting elements 17a to produce luminescence according to the image data by driving the drive elements 17b through a supply of the scanning signal, which has been supplied from the control circuit 23, to the pixel units 17 included in the video display unit 20 via the gate line Hy.

Here, as shown in FIG. 3, the scanning signal transfer unit 25 includes a first scanning line drive circuit 25a, a second scanning line drive circuit 25b, a third scanning line drive circuit 25c, and a fourth scanning line drive circuit 25d. The first scanning line drive circuit 25a and the second scanning line drive circuit 25b drive the odd-numbered lines and the even-numbered lines of the gate lines Hy, respectively. The first scanning line drive circuit 25a and the second scanning line drive circuit 25b drive the drive elements 17b of the pixel units 17 based on the scanning signal supplied from the control circuit 23. The third scanning line drive circuit 25c and the fourth scanning line drive circuit 25d correspond, respectively, to the first power supply switching unit and the second power supply switching unit in the present invention. The third scanning line drive circuit 25c and the fourth scanning line drive circuit 25d put the display apparatus 11 in an image displaying state or an image not-displaying state on an odd-numbered-block basis or on an even-numbered-block basis, by providing a drive signal to the selecting elements 17c of all the pixel units 17 collectively via the odd-numbered lines and the even-numbered lines of the gate lines Hy.

The signal line drive circuit 26 supplies, to each of the pixel units 17 via the data lines Vx, a video signal which is to be scanned by the scanning signal transfer unit 25 and is to be displayed in each of the pixel units 17 connected to the gate lines Hy. At this time, the right-eye image data of one picture (one frame) is supplied to every other line of the gate lines Hy, starting from the gate line H1 that is the head line of the odd-numbered block of the video display unit 20 to the gate line Hy−1 that is the final line of the odd-numbered block. In addition, the left-eye image data subsequent to the right-eye image data is supplied to every other line of the gate lines Hy, starting from the gate line H2 that is the head line of the even-numbered block of the video display unit 20 to the gate line Hy that is the final line of the even-numbered block.

Next, the glasses unit 13 is described.

As shown in FIG. 1, the glasses unit 13 includes a right-eye shutter 13a and a left-eye shutter 13b.

Figure 4:
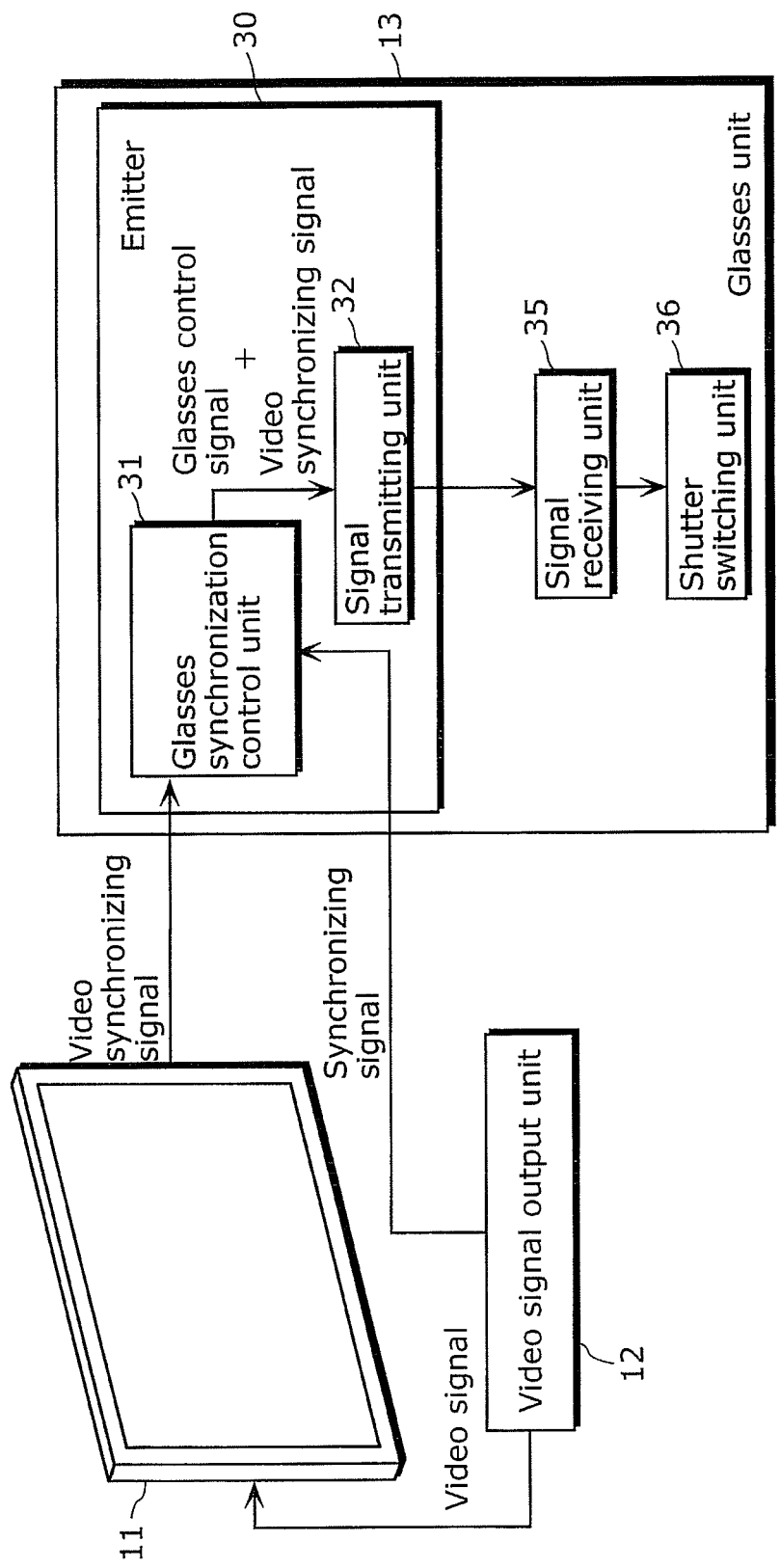
FIG. 4 is a block diagram showing a configuration of a glasses unit in FIG. 1.

FIG. 4 is a block diagram showing a configuration of the glasses unit 13. As shown in FIG. 4, the glasses unit 13 includes an emitter 30, a signal receiving unit 35, and a shutter switching unit 36. In addition, the emitter 30 includes a glasses synchronization control unit 31 and a signal transmitting unit 32. Here, the emitter 30 may be provided outside the glasses unit 13 instead of being incorporated therein, or may be incorporated in the display apparatus 11. In addition, the emitter 30 may also be configured in such a manner that signals are transmitted and received using, for example, infrared rays, without wired connection.

The glasses synchronization control unit 31 receives the video synchronizing signal output from the display apparatus 11 and the synchronizing signal output from the video signal output unit 12, and generates a glasses control signal. The glasses control signal is a control signal which causes one of the right eye shutter 13a and the left eye shutter 13b to open for a predetermined period from when the video synchronizing signal for each frame is started, and which causes the opened one of the right eye shutter 13a and the left eye shutter 13b to close after a lapse of the predetermined period. With this, control is performed for closing both shutters when switching between opening and closing of the right eye shutter 13a and the left eye shutter 13b is performed.

Subsequently, the glasses synchronization control unit 31 outputs the video synchronizing signal and the glasses control signal to the signal transmitting unit 32.

The signal transmitting unit 32 supplies the received video synchronizing signal and glasses control signal to the signal receiving unit 35. At this time, for example, in the case where the emitter 30 is provided outside the glasses unit 13, these signals are transmitted from the signal transmitting unit 32 to the signal receiving unit 35 in the glasses unit 13 using an infrared ray communication method.

Upon receiving the video synchronizing signal and the glasses control signal, the signal receiving unit 35 supplies these signals to the shutter switching unit 36. Then, with the glasses control signal, the shutter switching unit 36 controls the opening and closing of the right eye shutter 13a and the left eye shutter 13b of the glasses unit 13 in synchronization with the video synchronizing signal. The shutters of the glasses unit 13 are opened and closed using, for example, a liquid crystal drive method, and in this case, the shutters are opened and closed through control of applied voltage. This allows the viewer to recognize the right-eye video signal with the right eye and the left-eye video signal with the left eye. Note that the method for driving the shutters is not limited to the liquid crystal drive method but may be another driving method.

Next, the operation for driving the display apparatus 11 is described using a timing chart.

Figure 5:
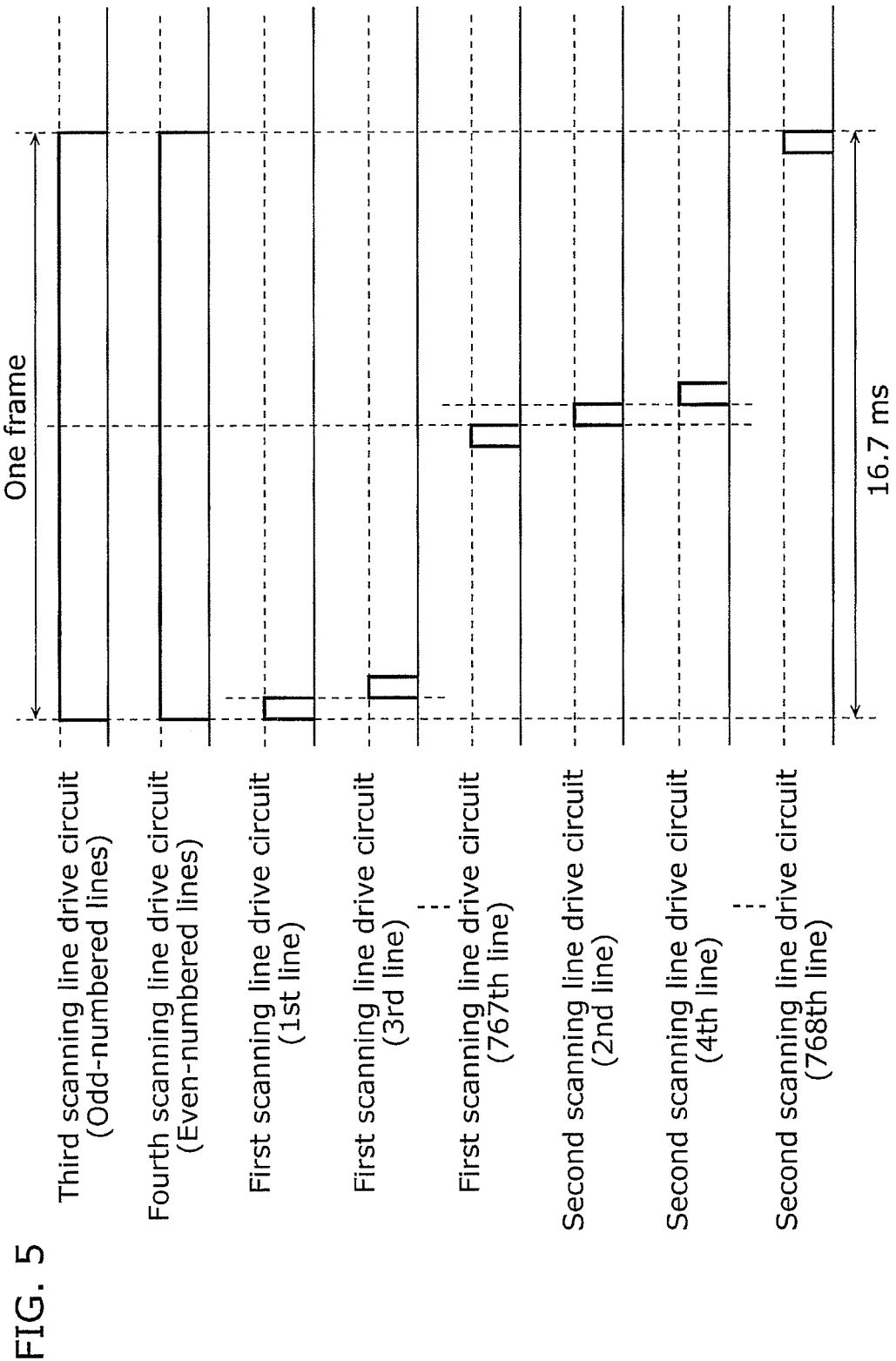
FIG. 5 is a timing chart showing timing of driving a stereoscopic display apparatus shown in FIG. 1 in an usual operation (flat display)
Figure 6:
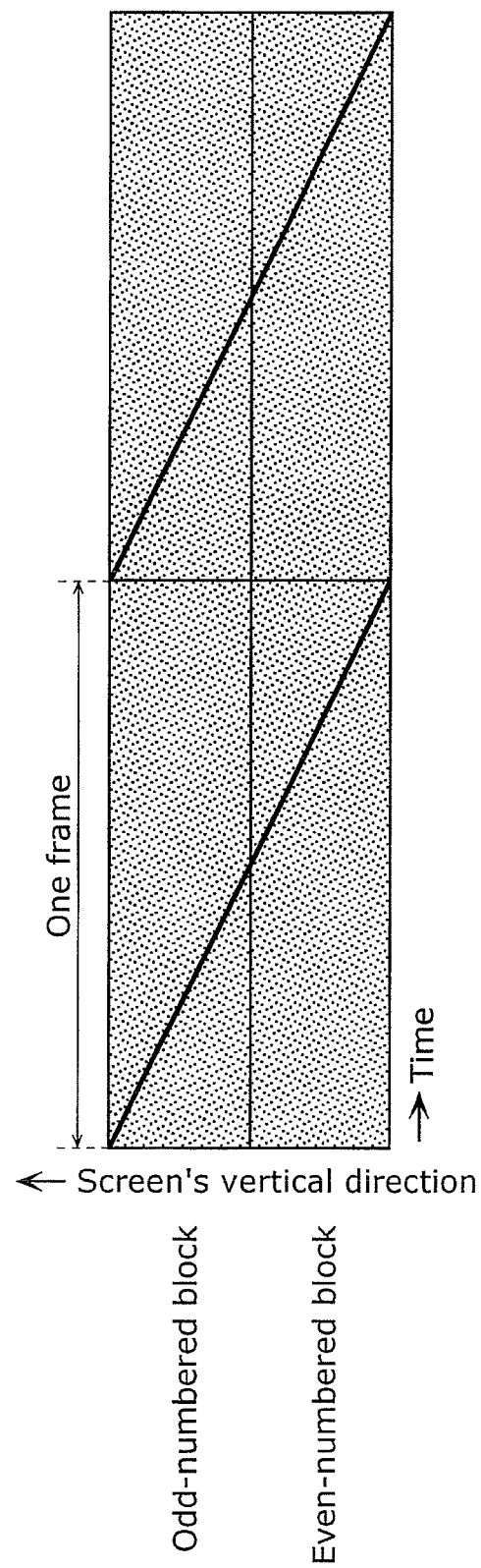
FIG. 6 shows an example of displayed video.
Figure 7:
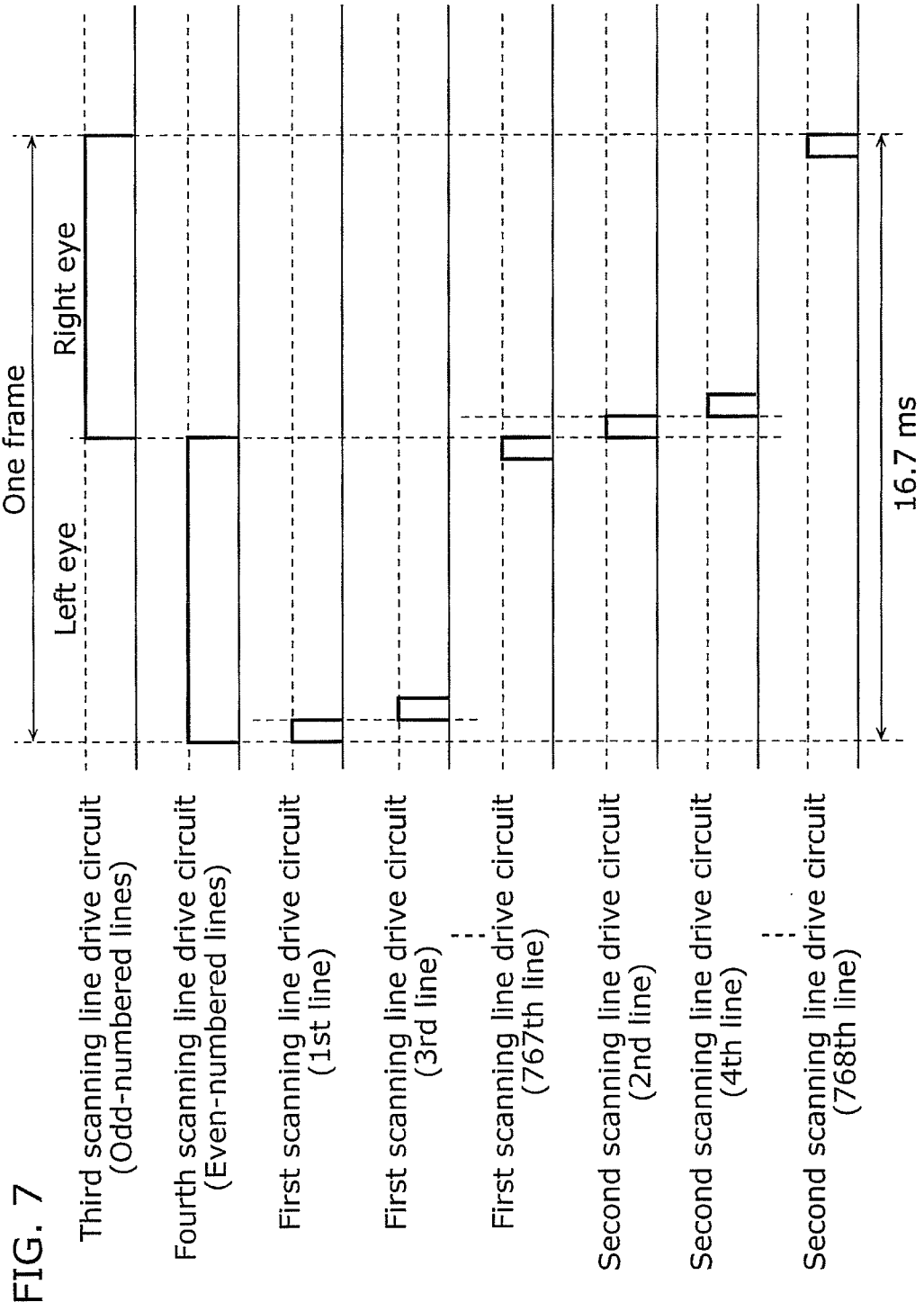
FIG. 7 is a timing chart showing timing of driving a stereoscopic display apparatus shown in FIG. 1 in stereoscopic display.
Figure 8:
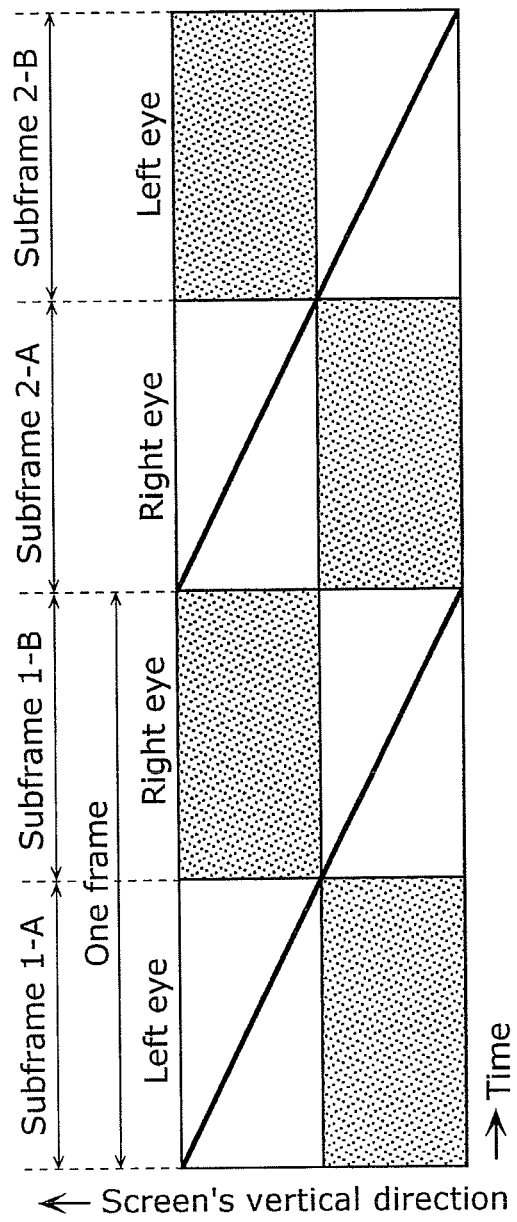
FIG. 8 shows an example of displayed video.

FIG. 5 is a timing chart showing timing of driving the display apparatus 11 to display video signals of one frame in an usual operation (flat display), and FIG. 6 shows an example of video displayed in the usual operation (flat display). FIG. 7 is a timing chart showing timing of driving the display apparatus 11 to display video signals of one frame in stereoscopic display, and FIG. 8 shows an example of video displayed in stereoscopic display. Note that FIGS. 5 to 8 show an example case in which the video display unit 20 has 768 scanning lines. Furthermore, the hatched portions in FIGS. 6 and 8 are video signals visible for the viewer.

As shown in FIG. 5, in the case of flat display, the third scanning line drive circuit 25c and the fourth scanning line drive circuit 25d constantly supply a high-level drive signal (pulse signal) to the selecting elements 17c of the pixel units 17. With this, the display apparatus 11 is put in the image displaying state both in the odd-numbered block and the even-numbered block. Note that the drive signal supplied to the selecting elements 17c may be a signal that puts, when it is in low level, the display apparatus 11 in the image displaying state.

Then, the first scanning line drive circuit 25a supplies a high-level pulse signal to each odd-numbered line (H1, H3, . . . , H767) in sequence, and at the same time, the signal line drive circuit 26 supplies image data corresponding to each pixel unit 17. Subsequently, in the same manner, the second scanning line drive circuit 25b supplies a high-level pulse signal to each even-numbered line (H2, H4, . . . , H768) in sequence, and at the same time, the signal line drive circuit 26 supplies image data corresponding to each pixel unit 17. In this way, the video display unit 20 displays a 2D image of one frame.

FIG. 6 shows an example of video displayed as a result of the above scan.

FIG. 6 shows, in relation to the pixel units in one column of the video display unit, a display time period of a video signal displayed by the video display unit. The vertical axis in FIG. 6 represents the vertical direction of the screen and the horizontal axis represents time. In addition, in FIG. 6, the upper half represents the odd-numbered block collectively showing the odd-numbered lines, whereas the lower half represents the even-numbered block collectively showing the even-numbered lines.

In other words, FIG. 6 shows that, continuously from the odd-numbered block to the even-numbered block of the video display unit 20, image data is supplied to the pixel units 17 in sequence, starting from a pixel unit 17 connected to the top scanning line of the video display unit 20 to a pixel unit 17 connected to the bottom scanning line, thereby resulting in display of a corresponding video signal.

Note that in the case of flat display, a video signal may be displayed alternately in an odd-numbered line and an even-numbered line from the data line H1 through to H768, instead of displaying a video signal on the even-numbered-block basis and on the odd-numbered-block basis.

On the other hand, as shown in FIG. 7, in the case of stereoscopic display, the third scanning line drive circuit 25c and the fourth scanning line drive circuit 25d supply, respectively, a low-level drive signal and a high-level drive signal (pulse signals) to the selecting elements 17c of the pixel units 17 during a time period in which the left-eye video signal of one frame is displayed and the right-eye image data of the frame is written. With this, the display apparatus 11 is put in the image not-displaying state in the odd-numbered block and in the image displaying state in the even-numbered block. In the same time period, the first scanning line drive circuit 25a supplies a high-level pulse signal to each odd-numbered line (H1, H3, . . . , H767) in sequence.

Subsequently, the third scanning line drive circuit 25c and the fourth scanning line drive circuit 25d supply, respectively, a high-level drive signal and a low-level drive signal (pulse signals) to the selecting elements 17c of the pixel units 17 during a time period in which the right-eye video signal of the frame is displayed and the left-eye image data of another frame is written. With this, the display apparatus 11 is put in the image displaying state in the odd-numbered block and the image not-displaying state in the even-numbered block. In the same time period, the second scanning line drive circuit 25b supplies a high-level pulse signal to each even-numbered line (H2, H4, . . . , H768) in sequence.

More specifically, the control by the control circuit 23 results as follows: the left-eye image data is written to the pixel units 17 of the even-numbered block when the right-eye video signal is displayed in the odd-numbered block; after the left-eye image data is written to the pixel units 17 of the even-numbered block, the left-eye video signal is displayed in the even-numbered block and no video signal is displayed in the odd-numbered block; the right-eye image data is written to the pixel units 17 of the odd-numbered block when the left-eye video signal is displayed in the even-numbered block; and after the right-eye image data is written to the pixel units 17 of the odd-numbered block, the right-eye video signal is displayed in the odd-numbered block and no video signal is displayed in the even-numbered block. These writing and display operations are repeated in sequence to display 3D images of one frame on the video display unit 20.

FIG. 8 shows an example of video displayed as a result of the above scan.

As shown in FIG. 8, continuously from the odd-numbered block to the even-numbered block of the video display unit 20, image data is written to the pixel units 17 in sequence, starting from a pixel unit 17 connected to the top scanning line of the video display unit 20 to a pixel unit 17 connected to the bottom scanning line.

Here, in the time period of a subframe 1-A shown in FIG. 8, the odd-numbered block is in the image not-displaying state, and therefore, the video display unit 20 displays no video signal in the odd-numbered block although the right-eye image data is written to the pixel units 17 of the odd-numbered block of the video display unit 20. On the other hand, the even-numbered block is in the image displaying state, and therefore, the left-eye image data written to the pixel units 17 of the even-numbered block in a previous frame is displayed as a video signal.

Furthermore, in the time period of a subframe 1-B subsequent to the subframe 1-A shown in FIG. 8, the even-numbered block is in the image not-displaying state, and therefore, the video display unit 20 displays no video signal in the even-numbered block although image data of a next subframe is written to the pixel units 17 of the even-numbered block of the video display unit 20. On the other hand, the odd-numbered block is in the image displaying state, and therefore, the right-eye image data written to the pixel units 17 of the odd-numbered block in the same frame is displayed as a video signal.

In the time period of a subframe 2-A subsequent to the subframe 1-B shown in FIG. 8, any of the left-eye image data and the right-eye image data can be displayed as a video signal. However, from the viewpoint of flicker prevention, it is more preferable, as shown in FIG. 8, to display the right-eye image data as a video signal in the time period of the subframe 2-A, and to display the left-eye image data as a video signal in the time period of a subframe 2-B. Such a driving method makes it possible, even in the case of stereoscopic display, to scan video signals at the same drive frequency as in the case of flat display shown in FIG. 6, that is, without raising the drive frequency of the video signals.

Figure 9:
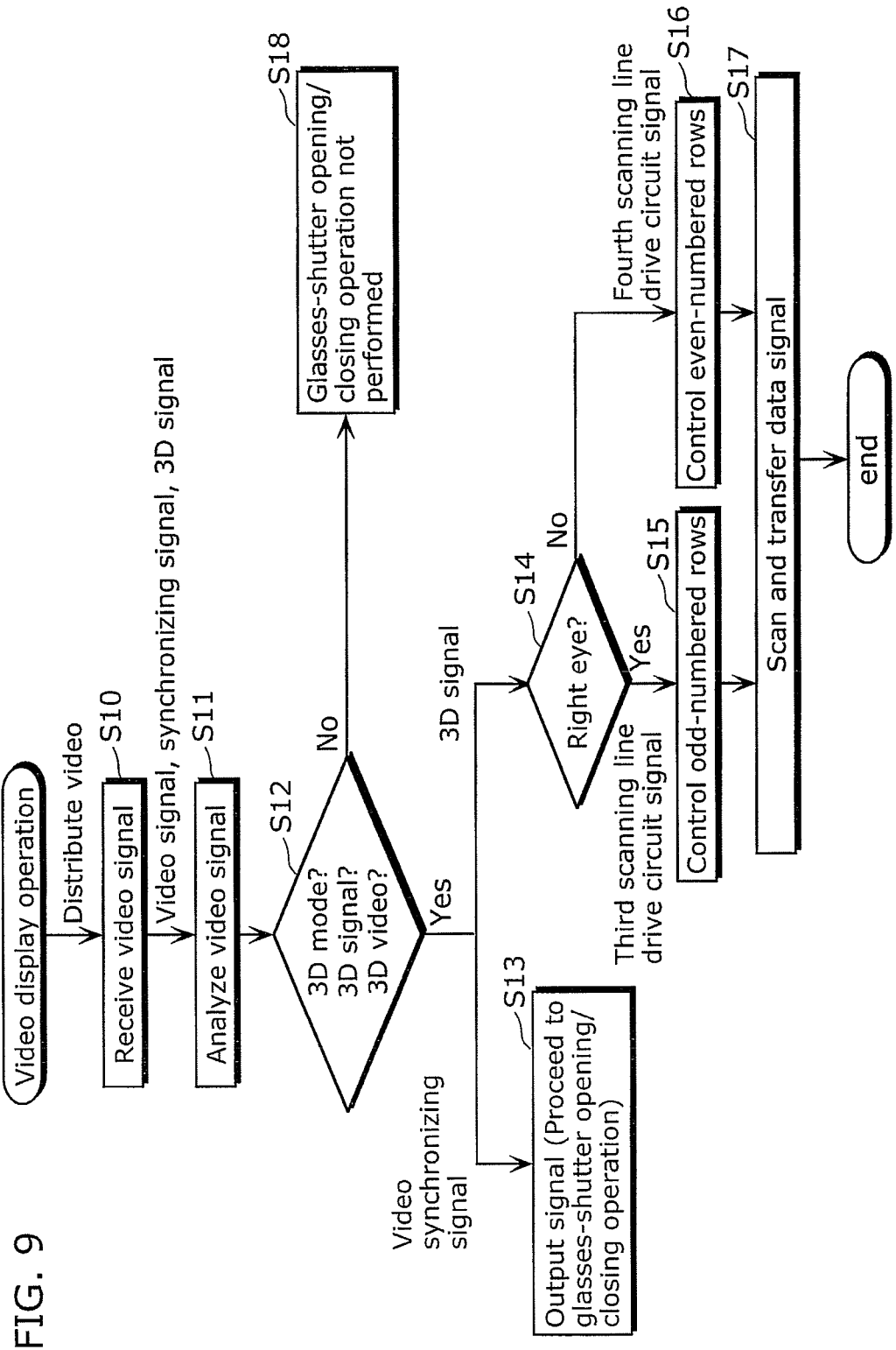
FIG. 9 is a flowchart showing an operation of a stereoscopic display apparatus shown in FIG. 1.

FIG. 9 shows a flowchart for causing the video display system 1 to operate with the above-described drive timing.

The right-eye video signal of one frame, output from the video signal output unit 12, is received by the signal input unit 21 of the display apparatus 11 (Step S10). To this video signal, a video synchronizing signal indicating timing of switching between right-eye video and left-eye video and a 3D signal including information concerning stereoscopic video are appended. Note that when the video is not stereoscopic video, no 3D signal is appended to the video signal. Then, having received the video signal, the signal input unit 21 supplies the video signal to the signal processing unit 22.

The signal processing unit 22 analyzes the video signal supplied (Step S11), and separates the video synchronizing signal and the 3D signal from the video signal. The signal processing unit 22 then detects whether or not the 3D signal is appended to the video signal (Step S12), generates a control signal for controlling whether to display the video signal in a stereoscopic manner or in a flat manner, and outputs the control signal to the control circuit 23. Here, in the case where the 3D signal is appended to the video signal, the signal processing unit 22 further separates the right-eye image data and the left-eye image data from the video signal.

In addition, in the case where the 3D signal is appended to the video signal, the signal processing unit 22 outputs the video synchronizing signal to the glasses unit 13 via the signal transmitting unit 24. Then, having received the video synchronizing signal, the glasses unit 13 performs a glasses-shutter opening/closing operation (Step S13).

Moreover, when the 3D signal is the right-eye image data (YES in Step S14), control is performed so that the odd-numbered block of the video display unit 20 is put in a collectively-not-displaying state and the even-numbered block is put in a collectively-displaying state (Step S15). More specifically, as described above, the control circuit 23 causes the third scanning line drive circuit 25c of the scanning signal transfer unit 25 to supply a low-level pulse signal to the selecting elements 17c of the pixel units 17 in the odd-numbered lines, and causes the fourth scanning line drive circuit 25d to supply a high-level pulse signal to the selecting elements 17c of the pixel units 17 in the even-numbered lines, so that the video display unit 20 displays the left-eye video signal written to the pixel units 17 of the even-numbered block, and the right-eye image data to be displayed next is written to the pixel units 17 of the odd-numbered block (Step S17).

On the other hand, when the 3D signal is not the right-eye image data, that is, when it is the left-eye image data (NO in Step S14), control is performed so that the even-numbered block of the video display unit 20 is put in the collectively-not-displaying state and the odd-numbered block is put in the collectively-displaying state (Step S16). More specifically, as described above, the control circuit 23 causes the fourth scanning line drive circuit 25d of the scanning signal transfer unit 25 to supply a low-level pulse signal to the selecting elements 17c of the pixel units 17 in the even-numbered lines, and causes the third scanning line drive circuit 25c to supply a high-level pulse signal to the selecting elements 17c of the pixel units 17 in the odd-numbered lines, so that the video display unit 20 displays the right-eye video signal written to the pixel units 17 of the odd-numbered block, and the left-eye image data to be displayed next is written to the pixel units 17 of the even-numbered block (Step S17).

Note that in the case where the 3D signal is not appended to the video signal, that is, when the video signal is a signal of 2D video, the glasses-shutter opening/closing operation of the glasses unit 13 is not performed (Step S18).

According to the above-described method of driving the display apparatus 11, the video signal is displayed with a luminance equivalent to that in the conventional driving method. The following describes a difference in advantageous effect obtained from video displayed according to: the above-described driving method; a conventional driving method in which a video signal is divided into a left-eye video signal and a right-eye video signal; and a conventional driving method in which a video signal is divided into a left-eye video signal and a right-eye video signal and a black signal is inserted.

Figure 10:
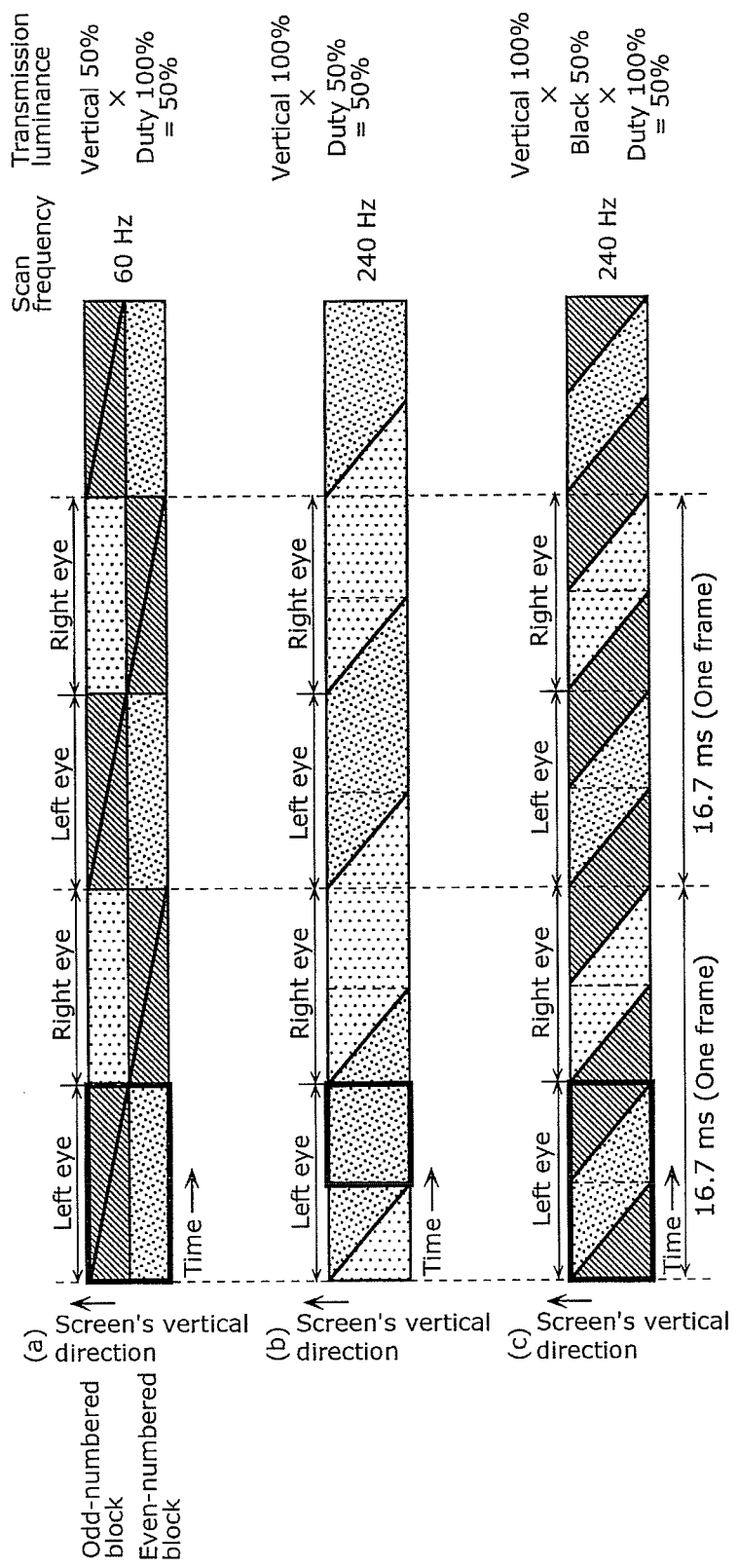
FIG. 10 shows video displayed with equivalent luminances; the part (a) shows video displayed according to a driving method in the present invention; the part (b) shows video displayed according to a conventional driving method in which a video signal is divided into a left-eye video signal and a right-eye video signal; and the part (c) shows video displayed according to a conventional driving method in which a video signal is divided into a left-eye video signal and a right-eye video signal and a black signal is inserted.

FIG. 10 shows video displayed when the display apparatus is driven by each driving method so that the respective luminances of the displayed video are equivalent to each other. The part (a) of FIG. 10 shows video displayed according to the driving method in the present invention; the part (b) of FIG. 10 shows video displayed according to the conventional driving method in which a video signal is divided into a left-eye video signal and a right-eye video signal; and the part (c) of FIG. 10 shows video displayed according to the conventional driving method in which a video signal is divided into a left-eye video signal and a right-eye video signal and a black signal is inserted. Here, the vertical axis represents the vertical direction of the screen and the horizontal axis represents time. In addition, the thickly-lined regions in the parts (a) to (c) of FIG. 10 show that the left-eye shutter 13b of the glasses unit 13 is open. Note that in the part (a) of FIG. 10, the upper half of the displayed video shows the odd-numbered block and the lower half shows the even-numbered block. In addition, in the parts (a) and (c) of FIG. 10, the hatched portions indicate that no video signal is displayed.

With the driving method in the present invention shown in the part (a) of FIG. 10, the transmission luminance is vertical 50%×duty 100%=50%. That is to say, with the driving method in the present invention, the video signal is displayed on the odd-numbered-block basis or on the even-numbered-block basis, and thus the luminance that the user recognizes in the vertical direction of the screen is 50% ("vertical 50%" mentioned above) of the luminance recognized in the case of displaying the video signal on the entire screen. In addition, the opening period of the left-eye shutter or the right-eye shutter is duty 100% per opening, given that the scanning time period of the left-eye or right-eye video signal of one frame (a half of one frame in time) is duty 100%. It follows that the transmission luminance is 50% as described above.

With the conventional driving method shown in FIG. 10 (b) in which a video signal is divided into a left-eye video signal and a right-eye video signal, the opening period of the right-eye shutter 13a or the left-eye shutter 13b is duty 50% per opening, thereby making the transmission luminance 50%.

With the conventional driving method shown in FIG. 10 (c) in which a video signal is divided into a left-eye video signal and a right-eye video signal and a black signal is inserted, the transmission luminance is black 50%×duty 100%=50%. More specifically, since a time period for displaying a black signal ("black 50%" mentioned above) is included in the scanning period of the left-eye video signal and the right-eye video signal, it is possible to keep the right-eye shutter or the left-eye shutter open even during the black signal display period, and therefore the duty is 100% per opening. It follows that the transmission luminance is 50% as described above.

Here, a difference in drive frequency (scan frequency) of the video signals displayed according to each of the above driving methods is described. Recognition of stereoscopic video with a disparity of a human's left and right eyes requires the frame frequency of a video signal of one frame for one eye to be approximately 60 Hz or higher. Given that the frame frequency of a video signal of one frame for one eye according to the driving method in the present invention shown in the part (a) of FIG. 10 is 60 Hz, the drive frequency (scan frequency) of the video signal is 60 Hz.

Here, with the conventional driving method in which a video signal is divided into a left-eye video signal and a right-eye video signal, no video signal is written or collectively displayed on the odd-numbered-block basis or on the even-numbered-block basis of the video display unit 20. Thus, as shown in the part (b) of FIG. 10, a luminance equivalent to that of the part (a) of FIG. 10 can be obtained by setting the drive frequency to 240 Hz. Furthermore, with the conventional driving method in which a video signal is divided into a left-eye video signal and a right-eye video signal and a black signal is inserted, too, no video signal is written or collectively displayed on the odd-numbered-block basis or on the even-numbered-block basis of the video display unit 20. Thus, as shown in the part (c) of FIG. 10, a luminance equivalent to that of the part (a) of FIG. 10 can be obtained by setting the drive frequency of the left-eye video signal and the right-eye video signal to 240 Hz.

This shows that with the conventional driving method in which a video signal is divided into a left-eye video signal and a right-eye video signal, and with the conventional driving method in which a video signal is divided into a left-eye video signal and a right-eye video signal and a black signal is inserted, the display apparatus needs to be driven at a drive frequency four times higher than that of the driving method in the present invention in order to display the video signal at a luminance equivalent of that of the video signal according to the present invention. To put it differently, with the driving method in the present invention, the video signal can be displayed at a luminance equivalent to that of the conventional methods at a drive frequency which is a quarter of those in the conventional methods. Thus, 3D video can be displayed with less power consumption.

Next, as the driving method in the present invention, the following describes a case in which the display apparatus is driven so that the vertical resolution of displayed video is equivalent to the vertical resolutions of video displayed according to the conventional driving methods.

Figure 11:
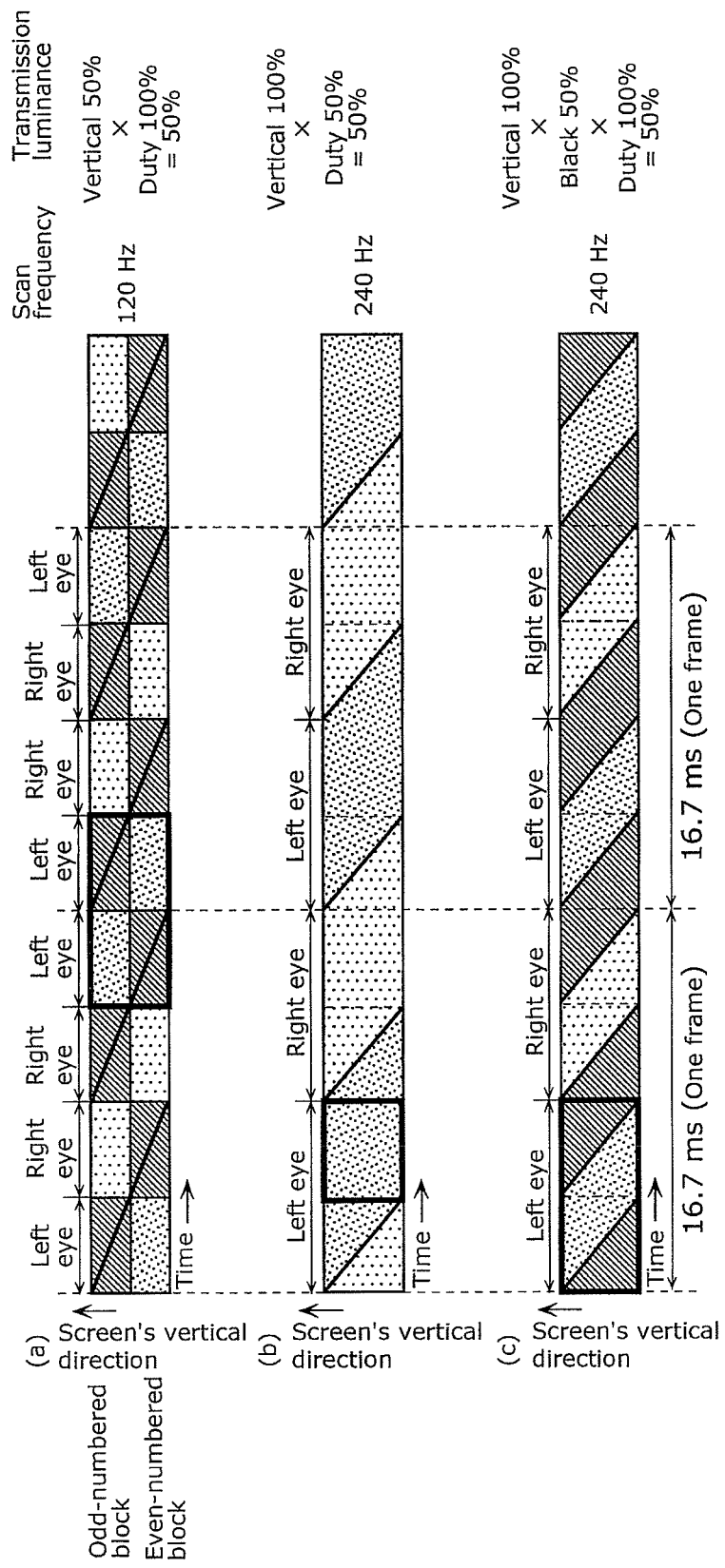
FIG. 11 shows video displayed with equivalent vertical resolutions; the part (a) shows video displayed according to a driving method in the present invention; the part (b) shows video displayed according to a conventional driving method in which a video signal is divided into a left-eye video signal and a right-eye video signal; and the part (c) shows video displayed according to a conventional driving method in which a video signal is divided into a left-eye video signal and a right-eye video signal and a black signal is inserted.

FIG. 11 shows video displayed when the display apparatus is driven by each driving method so that the respective vertical resolutions of the displayed video are equivalent to each other. The part (a) of FIG. 11 shows video displayed according to the driving method in the present invention; the part (b) of FIG. 11 shows video displayed according to the conventional driving method in which a video signal is divided into a left-eye video signal and a right-eye video signal; and the part (c) of FIG. 11 shows video displayed according to the conventional driving method in which a video signal is divided into a left-eye video signal and a right-eye video signal and a black signal is inserted. Note that in the part (a) of FIG. 11, the upper half of the displayed video shows the odd-numbered block and the lower half shows the even-numbered block. In addition, in the parts (a) and (c) of FIG. 11, the hatched portions indicate that no video signal is displayed. Note also that the parts (b) and (c) of FIG. 11 show the same displayed video as that in the parts (b) and (c) of FIG. 10 showing the above case of the driving methods by which the video signal is displayed with the equivalent luminance.

With the driving method in the present invention, the video signal is scanned and collectively displayed on the odd-numbered-block basis or on the even-numbered-block basis. Thus, to achieve the same vertical resolution as that in the cases of the parts (b) and (c) of FIG. 11 with the driving method in the present invention, it is necessary, as shown in the part (a) of FIG. 11, to scan the video signal at 120 Hz that is twice the drive frequency shown in the part (a) of FIG. 10.

More specifically, the control by the control circuit 23 results in display of 3D images of one frame on the video display unit 20 through a sequence of the following periods repeated: (i) a period in which the right-eye image data is written to the pixel units 17 of the odd-numbered block when the left-eye video signal is displayed in the even-numbered block, and after the right-eye image data is written to the pixel units 17 of the odd-numbered block, the right-eye video signal is displayed in the odd-numbered block and no video signal is displayed in the even-numbered block; (ii) a period in which the right-eye image data is written to the pixel units 17 of the even-numbered block when the right-eye video signal is displayed in the odd-numbered block, and after the right-eye image data is written to the pixel units 17 of the even-numbered block, the right-eye video signal is displayed in the even-numbered block and no video signal is displayed in the odd-numbered block; (iii) a period in which the left-eye image data is written to the pixel units 17 of the odd-numbered block when the right-eye video signal is displayed in the even-numbered block, and after the left-eye image data is written to the pixel units 17 of the odd-numbered block, the left-eye video signal is displayed in the odd-numbered block and no video signal is displayed in the even-numbered block; and (iv) a period in which the left-eye image data is written to the pixel units 17 of the even-numbered block when the left-eye video signal is displayed in the odd-numbered block, and after the left-eye image data is written to the pixel units 17 of the even-numbered block, the left-eye video signal is displayed in the even-numbered block and no video signal is displayed in the odd-numbered block.

This shows that with the conventional driving method in which a video signal is divided into a left-eye video signal and a right-eye video signal, and with the conventional driving method in which a video signal is divided into a left-eye video signal and a right-eye video signal and a black signal is inserted, the display apparatus needs to be driven at a drive frequency twice higher than that in the driving method in the present invention in order to display the video signal with a vertical resolution equivalent that of the video signal according to the present invention. To put it differently, with the driving method in the present invention, the video signal can be displayed with a vertical resolution equivalent to that in the conventional methods at a drive frequency which is a half of those in the conventional methods. Thus, 3D video can be displayed with less power consumption.

Next, as the driving method in the present invention, the following describes a case in which the display apparatus is driven so that the drive frequency of displayed video is equivalent to the drive frequencies of video displayed according to the conventional driving methods.

Figure 12:
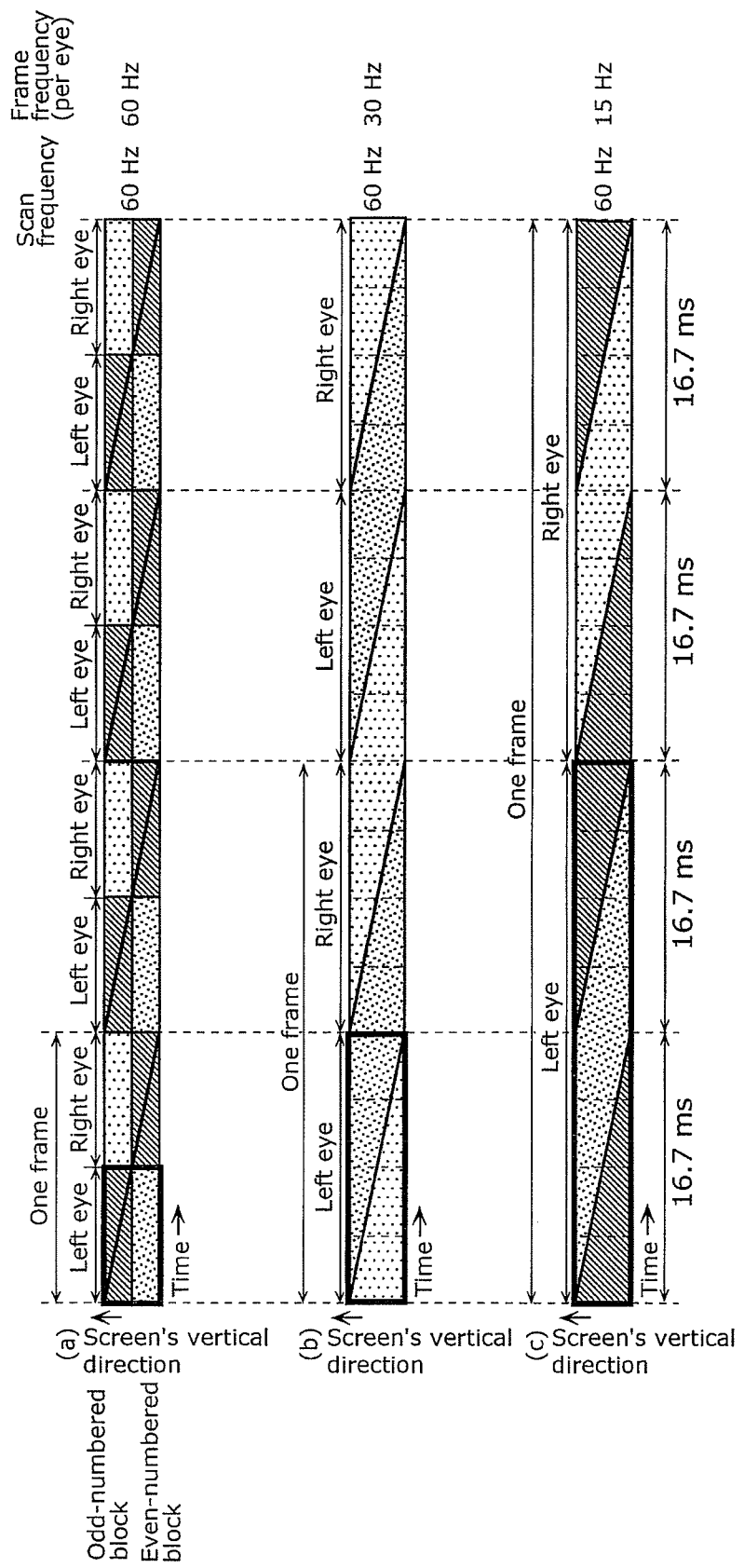
FIG. 12 shows video displayed with equivalent scan frequencies; the part (a) shows video displayed according to a driving method in the present invention; the part (b) shows video displayed according to a conventional driving method in which a video signal is divided into a left-eye video signal and a right-eye video signal; and the part (c) shows video displayed according to a conventional driving method in which a video signal is divided into a left-eye video signal and a right-eye video signal and a black signal is inserted.

FIG. 12 shows video displayed when the display apparatus is driven by each driving method so that the respective drive frequencies (scan frequencies) of the displayed video are equivalent to each other. The part (a) of FIG. 12 shows video displayed according to the driving method in the present invention; the part (b) of FIG. 12 shows video displayed according to the conventional driving method in which a video signal is divided into a left-eye video signal and a right-eye video signal; and the part (c) of FIG. 12 shows video displayed according to the conventional driving method in which a video signal is divided into a left-eye video signal and a right-eye video signal and a black signal is inserted. The part (a) of FIG. 12 shows the same displayed video as that in the part (a) of FIG. 10 showing the above case of the driving method by which the video signal is displayed with the equivalent luminance. In the part (a) of FIG. 12, the frame frequency of one frame for one eye and the drive frequency of the video signal are 60 Hz. Note that in the part (a) of FIG. 12, the upper half of the displayed video shows the odd-numbered block and the lower half shows the even-numbered block. In addition, in the parts (a) and (c) of FIG. 12, the hatched portions indicate that no video signal is displayed.

With the driving method in the present invention, the video signal is scanned and collectively displayed on the odd-numbered-block basis or on the even-numbered-block basis of the video display unit 20. Thus, when the video signal is scanned at the same scan frequency of 60 Hz as that in the driving method in the present invention using the conventional driving method in which a video signal is divided into a left-eye video signal and a right-eye video signal and the conventional driving method in which a video signal is divided into a left-eye video signal and a right-eye video signal and a black signal is inserted, the frame frequency of one frame for one eye is 30 Hz and 15 Hz as shown in the parts (b) and (c) of FIG. 12, respectively.

This shows that with the conventional driving method in which a video signal is divided into a left-eye video signal and a right-eye video signal, and the conventional driving method in which a video signal is divided into a left-eye video signal and a right-eye video signal and a black signal is inserted, the frame frequency is lower than that of the video signal according to the present invention. As a result, the time required for displaying the video signal of one frame increases, and it becomes difficult for the viewer to recognize the stereoscopic video with the disparity of the left and right eyes. To put it differently, with the driving method in the present invention, 3D video can be displayed with less power consumption at a drive frequency within a range that allows the viewer to recognize the stereoscopic video.

In the first embodiment, the third scanning line drive circuit 25c and the fourth scanning line drive circuit 25d are provided as the first power supply switching unit and the second power supply switching unit in the present invention, and the third scanning line drive circuit 25c and the fourth scanning line drive circuit 25d provide a drive signal to the selecting elements 17c of all the pixel units 17 collectively via the odd-numbered lines and the even-numbered lines of the gate lines Hy so as to put the display apparatus 11 in the image displaying state or the image not-displaying state in units of the odd-numbered lines or the even-numbered lines. However, it is also possible to put the display apparatus 11 in the image displaying state or the image not-displaying state on the odd-numbered-block basis or on the even-numbered-block basis collectively, by controlling ON and OFF of a power supply unit (not shown) that applies a voltage or a current to the drive elements 17b. In this case, there is no need to include the selecting elements 17c, the third scanning line drive circuit 25c, and the fourth scanning line drive circuit 25d, thereby making it possible to miniaturize the pixel units 17 and the display apparatus 11. In addition, although the first display region is the odd-numbered block and the second display region is the even-numbered block in the first embodiment, the first display region may be the upper half of the video display unit, and the second display region may be the lower half of the video display unit.

(Second Embodiment)

Next, the video display system according to a second embodiment of the present invention is described.

The second embodiment is different from the first embodiment in that a first control unit 23a and a second control unit 23b are included in the control circuit 23 instead of the third scanning line drive circuit and the fourth scanning line drive circuit included in the scanning signal transfer unit 25, so as to put the video display unit in the image displaying state or the image not-displaying state on the odd-numbered-block basis or on the even-numbered-block basis.

Figure 13:
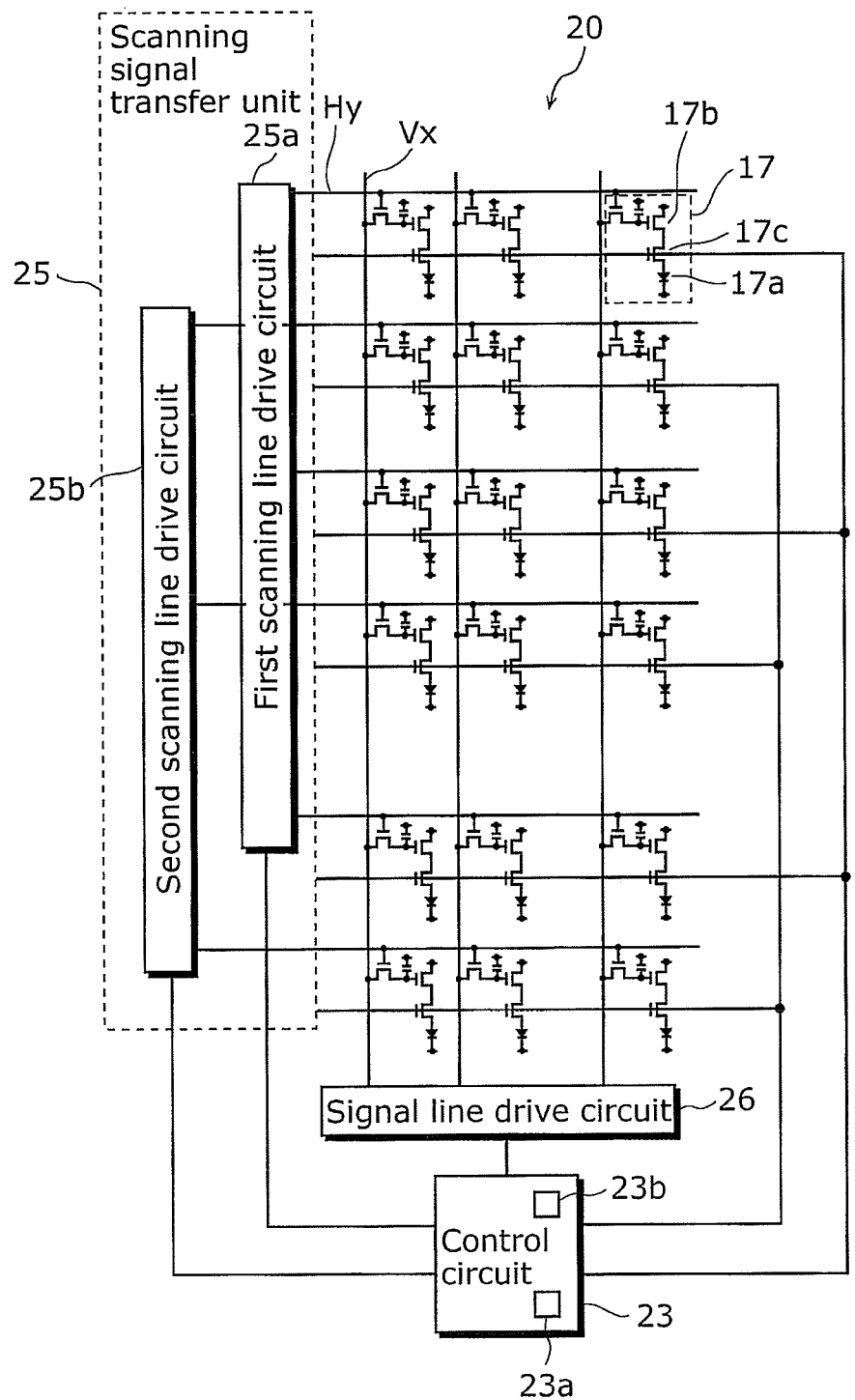
FIG. 13 is a circuit diagram showing a detailed configuration of a part of a display apparatus according to a second embodiment.

FIG. 13 shows a detailed configuration of the video display unit 20, the scanning signal transfer unit 25, the signal line drive circuit 26, and the control circuit 23 included in the display apparatus 11. As shown in FIG. 13, the control circuit 23 includes the first control unit 23a and the second control unit 23b. The first control unit 23a and the second control unit 23b correspond, respectively, to the first power supply switching unit and the second power supply switching unit in the present invention. The first control unit 23a and the second control unit 23b put the display apparatus 11 in the image displaying state or the image not-displaying state on the odd-numbered-block basis or on the even-numbered-block basis, by providing a drive signal to the selecting elements 17c of all the pixel units 17 collectively via the odd-numbered lines and the even-numbered lines of the gate lines Hy.

Figure 14:
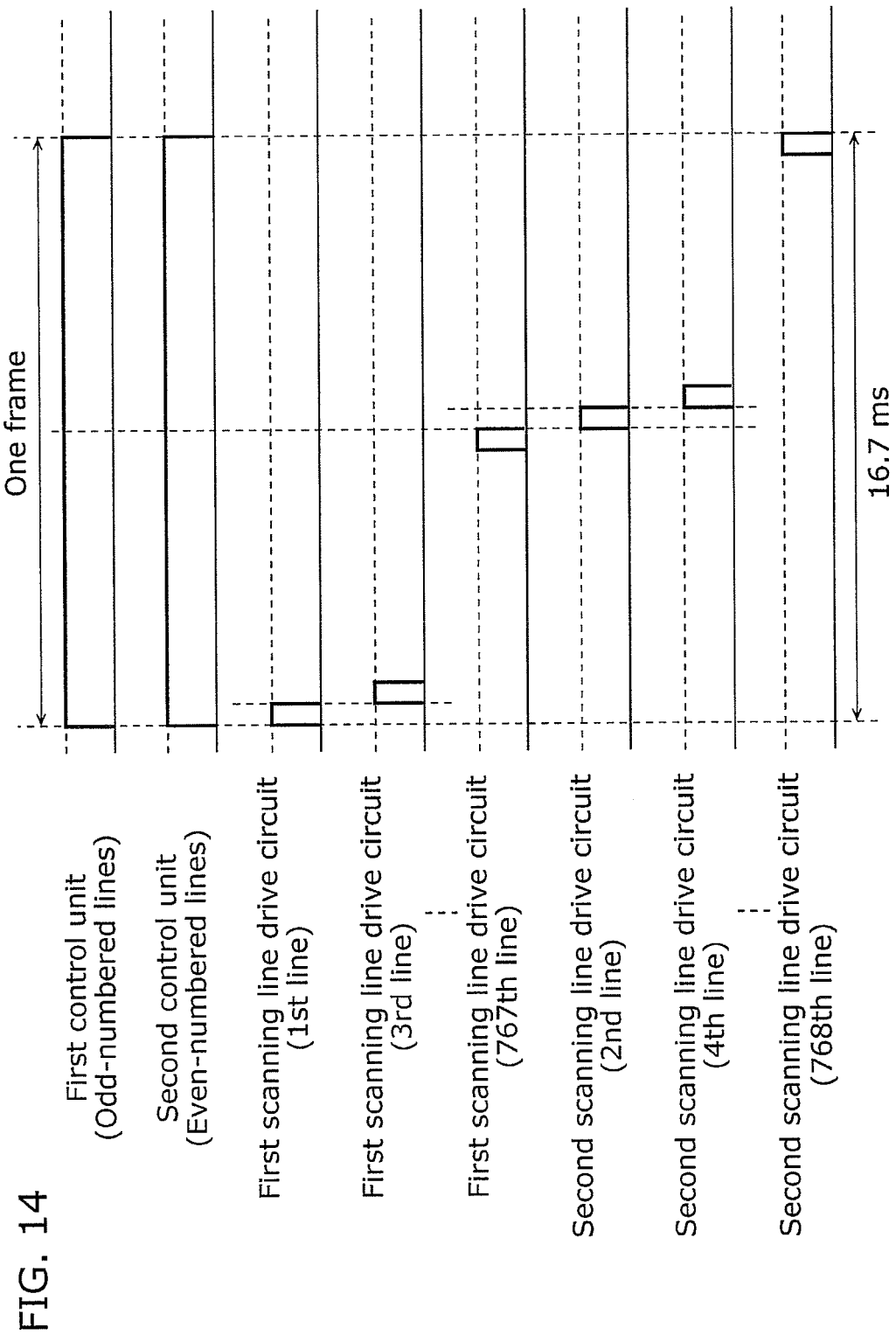
FIG. 14 is a timing chart showing timing of driving a stereoscopic display apparatus shown in FIG. 13 in an usual operation (flat display)
Figure 15:
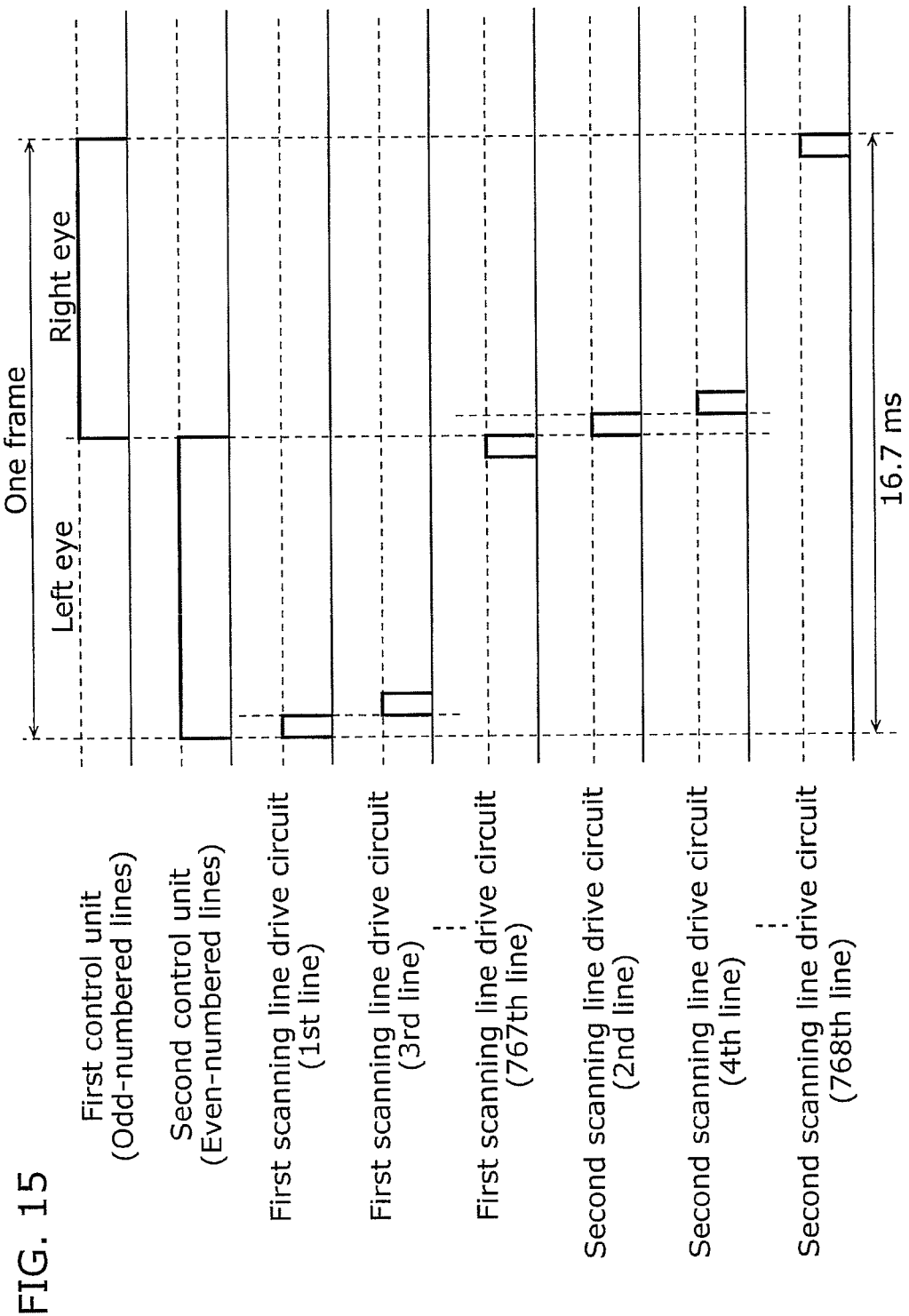
FIG. 15 is a timing chart showing timing of driving a stereoscopic display apparatus shown in FIG. 13 in stereoscopic display.

FIG. 14 is a timing chart showing timing of driving the display apparatus 11 to display video signals of one frame in an usual operation (flat display), and FIG. 15 is a timing chart showing timing of driving the display apparatus 11 to display video signals of one frame in stereoscopic display. FIGS. 14 and 15 show an example case in which the video display unit 20 has 768 scanning lines.

As shown in FIG. 14, in the case of flat display, the first control unit 23a and the second control unit 23b constantly supply a high-level drive signal (pulse signal) to the selecting elements 17c of the pixel units 17. With this, the display apparatus 11 is put in the image displaying state both in the odd-numbered block and the even-numbered block.

Then, the first scanning line drive circuit 25a supplies a high-level pulse signal to each odd-numbered line (H1, H3, . . . , H767) in sequence, and at the same time, the signal line drive circuit 26 supplies image data corresponding to each pixel unit 17. Subsequently, in the same manner, the second scanning line drive circuit 25b supplies a high-level pulse signal to each even-numbered line (H2, H4, . . . , H768) in sequence, and at the same time, the signal line drive circuit 26 supplies image data corresponding to each pixel unit 17. In this way, the video display unit 20 displays a 2D image of one frame as in FIG. 6 shown in the first embodiment.

As shown in FIG. 15, in the case of stereoscopic display, the first control unit 23a and the second control unit 23b supply, respectively, a low-level drive signal and a high-level drive signal (pulse signals) to the selecting elements 17c of the pixel units 17 during a time period in which the right-eye image data of one frame is written. With this, the display apparatus 11 is put in the image not-displaying state in the odd-numbered block and in the image displaying state in the even-numbered block. In the same time period, the first scanning line drive circuit 25a supplies a high-level pulse signal to each odd-numbered line (H1, H3, . . . , H767) in sequence. This means that during the time period in which the right-eye image data of one frame is written, the right-eye video signal being written is not displayed, but the left-eye video signal of the entire frame is displayed.

Subsequently, during a time period in which the left-eye image data of one frame is written, the first control unit 23a and the second control unit 23b supply, respectively, a high-level drive signal and a low-level drive signal (pulse signals) to the selecting elements 17c of the pixel units 17. With this, the display apparatus 11 is put in the image displaying state in the odd-numbered block and the image not-displaying state in the even-numbered block. In the same time period, the second scanning line drive circuit 25b supplies a high-level pulse signal to each even-numbered line (H2, H4, . . . , H768) in sequence. This means that during the time period in which the left-eye image data of one frame is written, the left-eye video signal being written is not displayed, but the right-eye video signal of the entire frame is displayed.

In this way, the video display unit 20 displays 3D images of one frame as in FIG. 8 shown in the first embodiment. Therefore, as with the video display system described in the first embodiment, it is possible to display 3D video with a lower drive frequency and less power consumption.

Note that in the second embodiment too, as in the first embodiment, it is possible to put the display apparatus 11 in the image displaying state or the image not-displaying state on the odd-numbered-block basis or on the even-numbered-block basis collectively, by controlling ON and OFF of a power supply unit (not shown) that applies a voltage or a current to the drive elements 17b. In this case, there is no need to include the selecting elements 17c, the first control unit 23a, and the second control unit 23b, thereby making it possible to miniaturize the pixel units 17 and the display apparatus 11. In addition, although the first display region is the odd-numbered block and the second display region is the even-numbered block in the second embodiment, the first display region may be the upper half of the video display unit, and the second display region may be the lower half of the video display unit.

(Third Embodiment)

Next, the video display system according to a third embodiment of the present invention is described.

The third embodiment is different from the first embodiment in that each pixel unit provided in the video display unit includes a liquid crystal element instead of an organic EL element.

Figure 16:
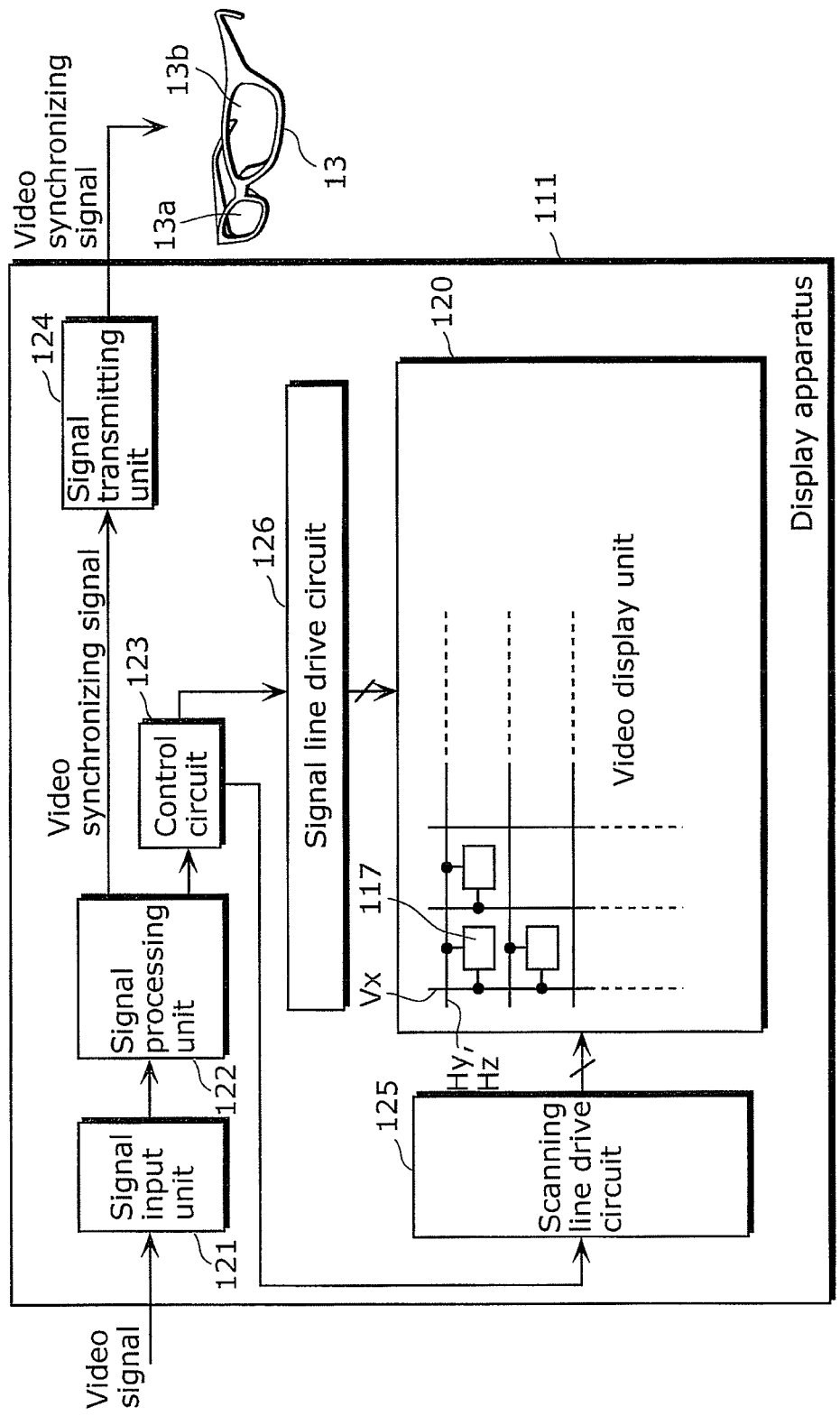
FIG. 16 is a block diagram showing a configuration of a stereoscopic display apparatus according to a third embodiment.

FIG. 16 is a block diagram showing a configuration of a display apparatus included in the video display system according to the third embodiment. As shown in FIG. 16, a display apparatus 111 includes: a video display unit 120, a signal input unit 121, a signal processing unit 122, a control circuit 123, a signal transmitting unit 124, a scanning line drive circuit 125, and a signal line drive circuit 126. Note that the video display unit 120, the control circuit 123, the scanning line drive circuit 125, and the signal line drive circuit 126 correspond, respectively, to the display unit, the display control unit, the scanning line drive unit, and the data line drive unit in the present invention. Note also that the signal input unit 121, the signal processing unit 122, the control circuit 123, the signal transmitting unit 124, the scanning line drive circuit 125, and the signal line drive circuit 126 are the same as the signal input unit 21, the signal processing unit 22, the control circuit 23, the signal transmitting unit 24, the scanning signal transfer unit 25, and the signal line drive circuit 26 described in the first embodiment, respectively. Thus, the detailed descriptions thereof are not repeated.

The video display unit 120 includes rows (lines) each including pixel units 117, and displays an image based on a video signal input into the display apparatus 111 from the video signal output unit 112. Connected to each pixel unit 117 are: a gate line Hy (y=1, 2, ..., y−1, y) and a gate line Hz (z=1, 2, ..., z−1, z) through which a scanning signal for driving drive elements 117d and 117e is supplied; and a data line Vx (x=1, 2, ..., x−1, x) through which a video signal is supplied to the pixel unit 117. The video display unit 120 includes: an odd-numbered block made up of the pixel units 117 connected to the odd-numbered lines of the gate lines Hy; and an even-numbered block made up of the pixel units 117 connected to the even-numbered lines of the gate lines Hy.

Figure 17:
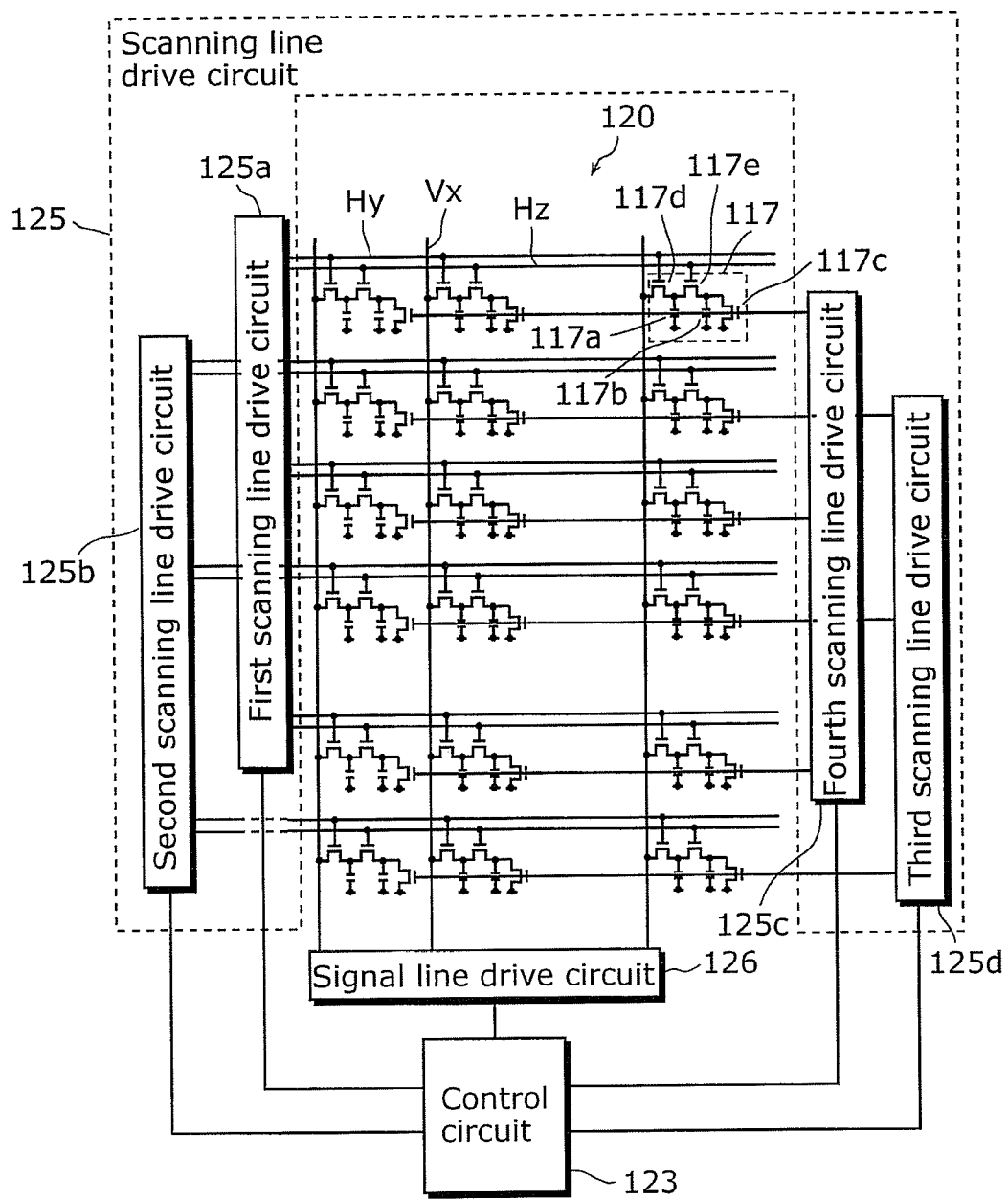
FIG. 17 is a circuit diagram showing a detailed configuration of a part of a display apparatus in FIG. 16.

FIG. 17 is a circuit diagram showing detailed configurations of the video display unit 120, the control circuit 123, the scanning line drive circuit 125, and the signal line drive circuit 126. As shown in FIG. 17, each pixel unit 117 includes, for example, a liquid crystal electrode 117a, a capacitor 117b, a selecting element 117c for selecting a pixel unit 117 in a desired line, and driving elements 117d and 117e that control supply of a voltage to the liquid crystal electrode 117a. In the pixel unit 117 selected by the operation of the selecting element 117c, according to the above-described video signal, the drive elements 117d and 117e are driven by a signal input into the gate line Hy and Hz, and a voltage is supplied to the liquid crystal electrode 117a according to the signal input from the data line Vx and the liquid crystal is thereby driven, so that a charge corresponding to the voltage is accumulated in the capacitor 117b and the video display is maintained.

As shown in FIG. 17, the scanning line drive circuit 125 includes a first scanning line drive circuit 125a, a second scanning line drive circuit 125b, a third scanning line drive circuit 125c, and a fourth scanning line drive circuit 125d. The first scanning line drive circuit 125a and the second scanning line drive circuit 125b drive the odd-numbered lines and the even-numbered lines of the gate lines Hy and Hz, respectively. The first scanning line drive circuit 125a and the second scanning line drive circuit 125b drive the drive elements 117d and 117e of the pixel units 117 based on the scanning signal supplied from the control circuit 123. The third scanning line drive circuit 125c and the fourth scanning line drive circuit 125d correspond, respectively, to the first power supply switching unit and the second power supply switching unit in the present invention. The third scanning line drive circuit 125c and the fourth scanning line drive circuit 125d put the display apparatus 111 in the image displaying state or the image not-displaying state on the odd-numbered-block basis or on the even-numbered-block basis, by providing a drive signal to the selecting elements 117c of all the pixel units 117 collectively via the odd-numbered lines and the even-numbered lines of the gate lines Hy and Hz.

With such a configuration, even a video display system including a liquid crystal panel display as the display apparatus can be driven by the same method of driving the video display system, described in the first embodiment, which includes the organic EL panel display as the display apparatus, and can display 3D video while reducing the drive frequency and the power consumption.

Note that in the third embodiment too, as in the first embodiment, it is possible to put the display apparatus 111 in the image displaying state or the image not-displaying state on the odd-numbered-block basis or on the even-numbered-block basis collectively, by controlling ON and OFF of a power supply unit (not shown) that applies a voltage or a current to the drive elements 117d and 117e. In this case, there is no need to include the selecting elements 117c, the third scanning line drive circuit 125c, and the fourth scanning line drive circuit 125d, thereby making it possible to miniaturize the pixel units 117 and the display apparatus 111. In addition, although the first display region is the odd-numbered block and the second display region is the even-numbered block in the third embodiment, the first display region may be the upper half of the video display unit, and the second display region may be the lower half of the video display unit.

(Fourth Embodiment)

Next, the video display system according to a fourth embodiment of the present invention is described.

The fourth embodiment is different from the first embodiment in that a first control unit 123a and a second control unit 123b are included in the control circuit 123 instead of the third scanning line drive circuit and the fourth scanning line drive circuit included in the scanning line drive circuit 125, so as to put the display apparatus 111 in the image displaying state or the image not-displaying state on the odd-numbered-block basis or on the even-numbered-block basis.

Figure 18:
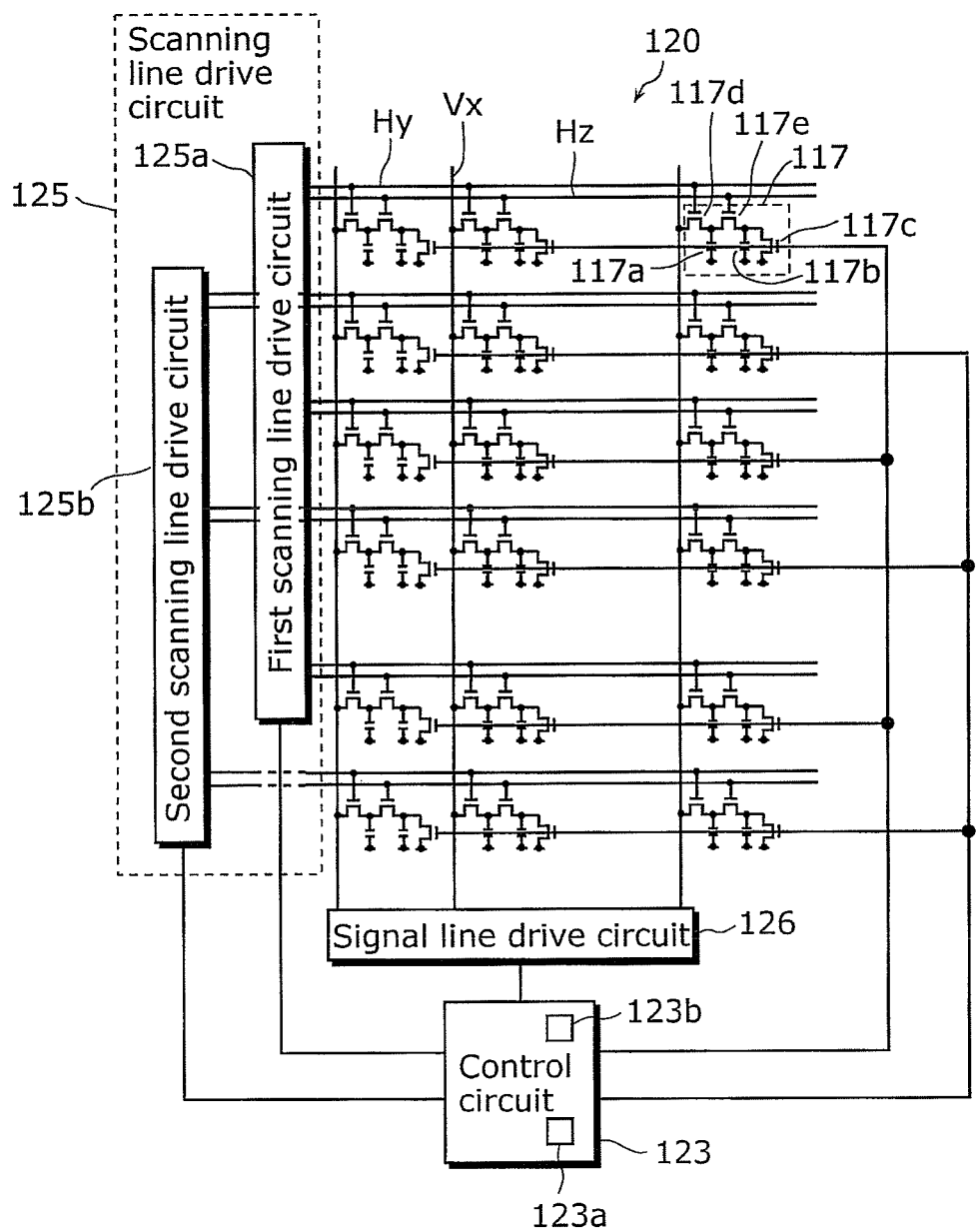
FIG. 18 is a circuit diagram showing a detailed configuration of a part of a display apparatus according to a fourth embodiment.

FIG. 18 shows detailed configurations of the video display unit 120, the scanning line drive circuit 125, the signal line drive circuit 126, and the control circuit 123 included in the display apparatus 111. As shown in FIG. 18, the control circuit 123 includes the first control unit 123a and the second control unit 123b. The first control unit 123a and the second control unit 123b correspond, respectively, to the first power supply switching unit and the second power supply switching unit in the present invention. The first control unit 123a and the second control unit 123b put the display apparatus 111 in the image displaying state or the image not-displaying state on the odd-numbered-block basis or on the even-numbered-block basis, by providing a drive signal to the selecting elements 117c of all the pixel units 117 collectively via the odd-numbered lines and the even-numbered lines of the gate lines Hy and Hz.

With such a configuration, even a video display system including a liquid crystal panel as the display apparatus can be driven by the same driving method as the method of driving the video display system, described in the first embodiment, which includes the organic EL panel display as the display apparatus, and can display 3D video while reducing the drive frequency and the power consumption.

Note that in the fourth embodiment too, as in the first embodiment, it is possible to put the display apparatus 111 in the image displaying state or the image not-displaying state on the odd-numbered-block basis or the even-numbered-block basis collectively, by controlling ON and OFF of a power supply unit (not shown) that applies a voltage or a current to the drive elements 117d and 117e. In this case, there is no need to include the selecting elements 117c, the first control unit 123a, and the second control unit 123b, thereby making it possible to miniaturize the pixel units 117 and the display apparatus 111. In addition, although the first display region is the odd-numbered block and the second display region is the even-numbered block in the fourth embodiment, the first display region may be the upper half of the video display unit, and the second display region may be the lower half of the video display unit.

Note that the present invention is not limited to the above embodiments, and various modifications and variations can be implemented within the scope of the present invention.

For example, although the first display region is the odd-numbered block and the second display region is the even-numbered block in the above embodiments, the first display region may be the upper half of the video display unit, and the second display region may be the lower half of the video display unit. In addition, the video display unit may be divided into a greater number of display regions.

Moreover, although the above embodiments have illustrated, as an example, the video display system which includes, as the first power supply switching unit and the second power supply switching unit, either the third scanning line drive circuit and the fourth scanning line drive circuit or the first control unit and the second control unit, it is also possible to put the video display unit in the image displaying state or the image not-displaying state on the odd-numbered-block basis or on the even-numbered-block basis, by collectively controlling the drive elements through control on a power supply unit (not shown) that applies a voltage or a current to the drive elements of the pixels units.

Furthermore, although both the first scanning line drive circuit and the second scanning line drive circuit are provided as the scanning line driving circuit in the above embodiments, there may be only one scanning line driving circuit. In this case, it is possible to achieve the same advantageous effect as that of the present invention by displaying video signals alternately in the first display region and the second display region using an interlace scanning method.

In addition, although the above embodiments have illustrated, as an example, the video display system including, as the display apparatus, an organic EL panel display or a liquid crystal panel display, the present invention is not limited to the case of including such display as the display apparatus, and may also be applied to a video display system including a display apparatus of another method.

Moreover, the method for driving the shutters of the glasses unit is not limited to the liquid crystal drive method but may be another driving method.

In addition, the emitter of the glasses unit may be an external emitter provided outside the main body of the glasses unit. The emitter may also be incorporated in the display apparatus. The external emitter may be configured in such a manner that signals are transmitted and received between the emitter and the glasses unit using, for example, infrared rays, without the emitter being connected with the glasses unit with wiring.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The method of driving a stereoscopic display apparatus and the stereoscopic display apparatus according to the present invention can be used for displays used in displaying stereoscopic video, and are particularly useful for hold-type-driven organic EL panel displays.

What is claimed is:

1. A method of driving a stereoscopic display apparatus, the stereoscopic display apparatus including:
   an image displayer including a display configured to sequentially display a right-eye image and a left-eye image, the display including a first display region including a plurality of first rows and a second display region including a plurality of second rows different than the plurality of first rows; and
   a viewer configured to sequentially view the right-eye image and the left-eye image,
   the method comprising:
   writing, as a first event, first image data to the second display region when the first display region is in an image displaying state;
   setting, as a second event, the second display region to the image displaying state and the first display region to an image not-displaying state after the first image data is written to the second display region;
   writing, as a third event, second image data to the first display region when the second display region is in the image displaying state;
   setting, as a fourth event, the first display region to the image displaying state and the second display region to the image not-displaying state after the second image data is written to the first display region; and
   sequentially repeating the writing of the first image data as a fifth event, the setting of the second display region to the image displaying state and the first display region to the image not-displaying state as a sixth event, the writing of the second image data as a seventh event, and the setting of the first display region to the image displaying state and the second display region to the image not-displaying state as an eighth event,
   wherein each of the right-eye image and the left-eye image includes a first group and a second group, the first group and the second group each corresponding to one of the first display region and the second display region,
   a first period includes the first event and the second event and corresponds to the first group of the right-eye image, a second period includes the third event and the fourth event and corresponds to the second group of the right-eye image, a third period includes the fifth event and the sixth event and corresponds to the first group of the left-eye image, and a fourth period includes the seventh event and eighth second event and corresponds to the second group of the left-eye image, and
   the first image data and the second image data are written in corresponding ones of the first period, the second period, the third period, and the fourth period to display images of the first image data and the second image data.

2. The method of driving a stereoscopic display apparatus according to claim 1, wherein the plurality of first rows and the plurality of second rows are each different ones of odd-numbered rows starting from an end of the display and even-numbered rows starting from the end of the display.

3. The method of driving a stereoscopic display apparatus according to claim 1, wherein the plurality of first rows and the plurality of second rows are each different ones of rows located in an upper half of the display and rows located in a lower half of the display.

4. The method of driving a stereoscopic display apparatus according to claim 1, wherein the display includes an organic electroluminescent element.

5. A stereoscopic display apparatus, comprising:
an image displayer including a display configured to sequentially display a right-eye image and a left-eye image; and
a viewer configured to sequentially view the right-eye image and the left-eye image,
wherein the display includes:
a first display region including a plurality of first rows;
a second display region including a plurality of second rows different than the plurality of first rows included in the first display region; and
a plurality of display pixels arranged in each of the plurality of first rows and the plurality of second rows,
the plurality of first rows and the plurality of second rows are each different ones of rows located in an upper half of the display and rows located in a lower half of the display,
the image displayer includes a display controller configured to write image data to the first display region and the second display region, and to switch each of the first display region and the second display region between an image displaying state and an image not-displaying state, and
the display controller is configured to:
write image data to the second display region when the first display region is in the image displaying state;
set the second display region to the image displaying state and the first display region to the image not-displaying state after the image data is written to the second display region;
write image data to the first display region when the second display region is in the image displaying state; and
set the first display region to the image displaying state and the second display region to the image not-displaying state after the image data is written to the first display region.

6. The stereoscopic display apparatus according to claim 5, wherein the display includes an organic electroluminescent element.

7. The stereoscopic display apparatus according to claim 5, wherein the display controller includes:
a scanning line driver configured to supply a scanning signal to the plurality of display pixels on a row-by-row basis;
a data line driver configured to write the image data to each of the plurality of display pixels; and
a power supply switch configured to supply one of a driving current and a driving voltage to the plurality of display pixels, and to switch the first display region and the second display region between the image displaying state and the image not-displaying state based on whether the one of the driving current and the driving voltage is supplied.

8. The stereoscopic display apparatus according to claim 7, wherein the scanning line driver includes:
a first scanning line driver configured to supply the scanning signal to the plurality of display pixels arranged in the plurality of first rows included in the first display region;
a first power supply switch configured to switch states of the plurality of display pixels arranged in the plurality of first rows included in the first display region between the image displaying state and the image not-displaying state;
a second scanning line driver configured to supply the scanning signal to the plurality of display pixels arranged in the plurality of second rows included in the second display region; and
a second power supply switch configured to switch states of the plurality of display pixels arranged in the plurality of second rows included in the second display region between the image displaying state and the image not-displaying state.

* * * * *